(12) United States Patent
Blaiotta et al.

(10) Patent No.: US 12,367,377 B2
(45) Date of Patent: Jul. 22, 2025

(54) MAKING TIME-SERIES PREDICTIONS USING A TRAINED DECODER MODEL

(71) Applicant: Robert Bosch GmbH, Stuttgart (DE)

(72) Inventors: Claudia Blaiotta, Stuttgart (DE); Sebastian Ziesche, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1042 days.

(21) Appl. No.: 17/348,367

(22) Filed: Jun. 15, 2021

(65) Prior Publication Data

US 2021/0394784 A1 Dec. 23, 2021

(30) Foreign Application Priority Data

Jun. 22, 2020 (EP) .................................... 20181464

(51) Int. Cl.
*G06N 3/04* (2023.01)
*B60W 60/00* (2020.01)
*G05B 13/02* (2006.01)
*G06F 11/30* (2006.01)
*G06F 16/901* (2019.01)
*G06N 3/045* (2023.01)
*G06N 3/0455* (2023.01)
*G06N 3/08* (2023.01)
(Continued)

(52) U.S. Cl.
CPC ......... *G06N 3/0455* (2023.01); *B60W 60/001* (2020.02); *G05B 13/027* (2013.01); *G06F 11/3013* (2013.01); *G06F 16/9024* (2019.01); *G06N 3/045* (2023.01); *G06N 3/08* (2013.01); *G06V 10/776* (2022.01); *G06V 10/84* (2022.01); *G06V 20/56* (2022.01); *G06V 40/20* (2022.01); *B60W 2555/00* (2020.02)

(58) Field of Classification Search
CPC ......... G06N 3/0455; G06N 3/08; G06N 3/045
See application file for complete search history.

(56) References Cited

U.S. PATENT DOCUMENTS 10,445,356 B1 * 10/2019 Mugan .................... G06N 3/044
11,409,304 B1 * 8/2022 Cai ........................... B60R 1/00

OTHER PUBLICATIONS

Amini Variational Autoencoder for Autonomous Driving 2018.*
(Continued)

*Primary Examiner* — Paul M Knight
(74) *Attorney, Agent, or Firm* — NORTON ROSE FULBRIGHT US LLP

(57) ABSTRACT

A computer-implemented prediction method of making time-series predictions for controlling and/or monitoring a computer-controlled system, such as a semi-autonomous vehicle. The method uses a time series of one or more observed states. A state comprises values of measurable quantities of multiple interacting objects. Based on the observed states, values of time-invariant latent features for the multiple objects are determined, for example, according to an encoder model. A decoder model is then used to predict at least one next state. This involves applying a trained graph model to obtain a first prediction contribution based on an object's interactions with other objects, and applying a trained function to obtain a second prediction contribution based just on information about the object itself. Based on the predicted next state, output data is generated for use in controlling and/or monitoring the computer-controlled system.

14 Claims, 7 Drawing Sheets

(51) Int. Cl.
  G06V 10/776  (2022.01)
  G06V 10/84   (2022.01)
  G06V 20/56   (2022.01)
  G06V 40/20   (2022.01)

(56) References Cited

OTHER PUBLICATIONS

Kipf Neural Relational Inference for Interacting Systems 2018.*
Lee Joint Interaction and Trajectory Prediction for Autonomous Driving using GNNs 2019.*
Tong Graph Embedding for Deep Learning 2019.*
Wang Unsupervised Pedestrian Trajectory Prediction with Graph NNs 2019.*
Yasrab An Encoder Decoder Based CNN for Driver Assistance 2017.*
Zhou Graph neural networks A review of methods and applications Not Prior Art Pub 2021.*
Rudenko Human motion trajectory prediction a survey Jun. 8, 2020.*
Blaiotta Learning Generative Socially Aware Models of Pedestrian Motion 2019.*
Grigorescu A Survey of Deep Learning Techniques for Autonomous Driving 2019.*
Lee Desire Distant Future Prediction in Dynamic Scenes with Interacting Agents 2017.*
Liu Creating Autonomous Vehicle Systems 2018.*
Zhu VisionNet Drivable Space Interactive Motion Predicting Jan. 2020.*
Zou MultiMotal Pedestrian Trajectory Prediction Mar. 2020.*
Kipf et al., "Neural Relational Inference for Interacting Systems," Cornell University, 2018, pp. 1-17. <https://arxiv.org/pdf/1802.04687.pdf> Downloaded Jun. 14, 2021.
Scarselli et al., "The Graph Neural Network Model," IEEE Transactions on Neural Networks, vol. 20, No. 1, 2009, pp. 61-80. <https://persagen.com/files/misc/scarselli2009graph.pdf> Downloaded Jun. 14, 2021.
Battaglia et al., "Interaction Networks for Learning About Objects, Relations and Physics," Cornell University, 2016, pp. 1-12. <https://arxiv.org/pdf/1612.00222.pdf> Downloaded Jun. 14, 2021.
Blaiotta, "Learning Generative Socially Aware Models of Pedestrian Motion," IEEE Robotics and Automation Letters, vol. 4, No. 4, 2019, pp. 3433-3440.
Wang et al.,"Unsupervised Pedestrian Trajectory Prediction With Graph Neural Networks," IEEE 31st International Conference on Tools With Artificial Intelligence (ICTAI), 2019, pp. 832-839.
Lee et al., "Joint Interaction and Trajectory Prediction for Autonomous Driving Using Graph Neural Networks," Machine Learning for Autonomous Driving Workshop at the 33rd Conference on Neural Information Processing Systems (NEURIPS), 2019, pp. 1-9.
Kingma et al., "ADAM: a Method for Stochastic Optimization," Cornell University, 2017, pp. 1-15. <https://arxiv.org/pdf/1412.6980.pdf> Downloaded Jun. 14, 2021.

* cited by examiner

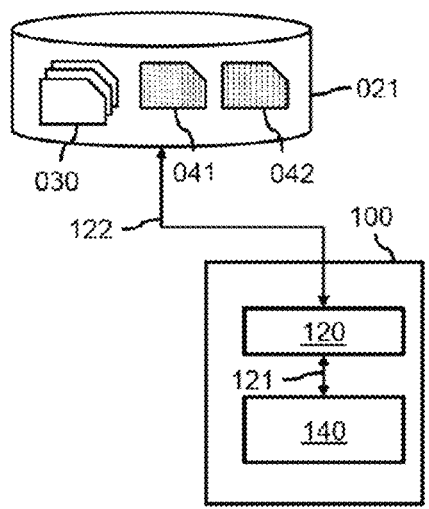
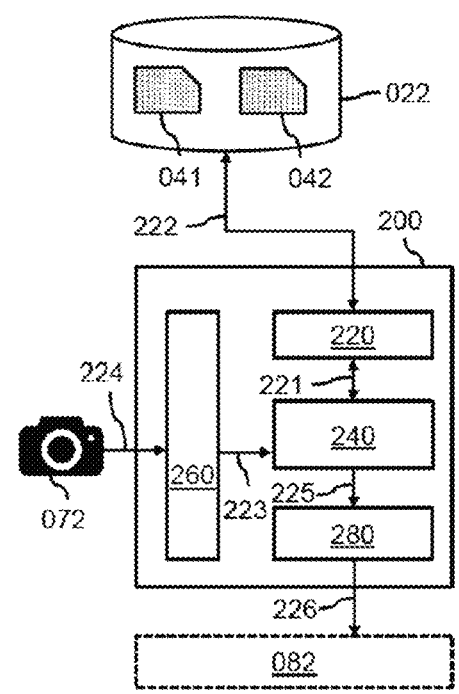
Fig. 1
Fig. 2

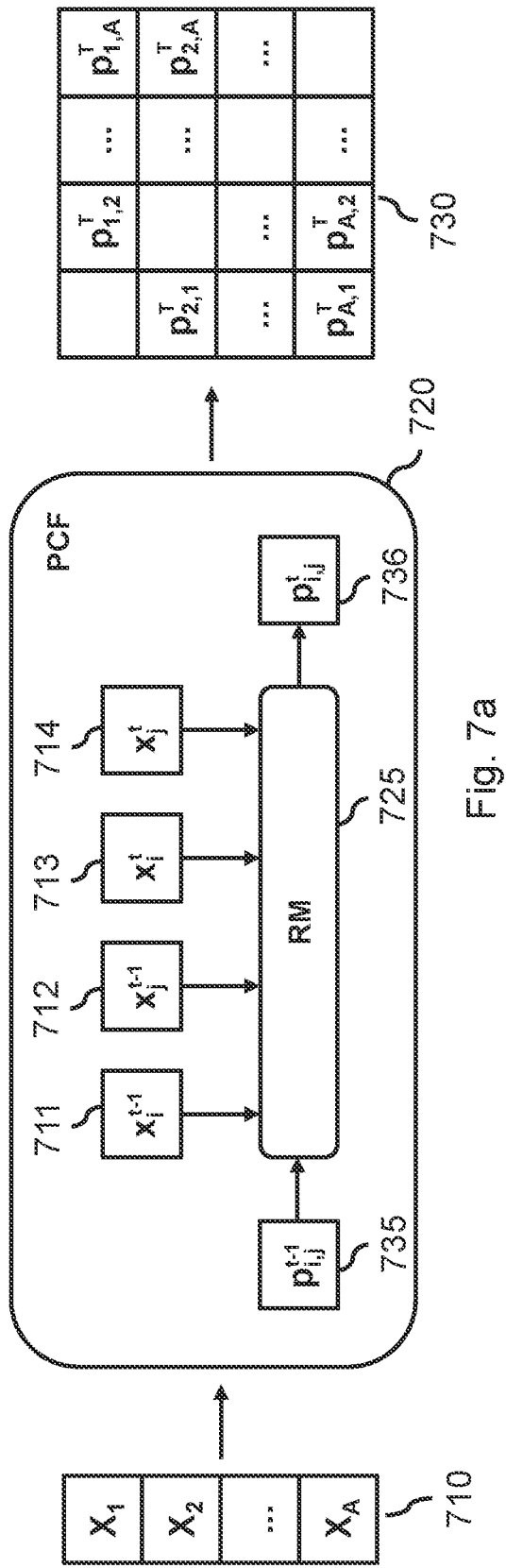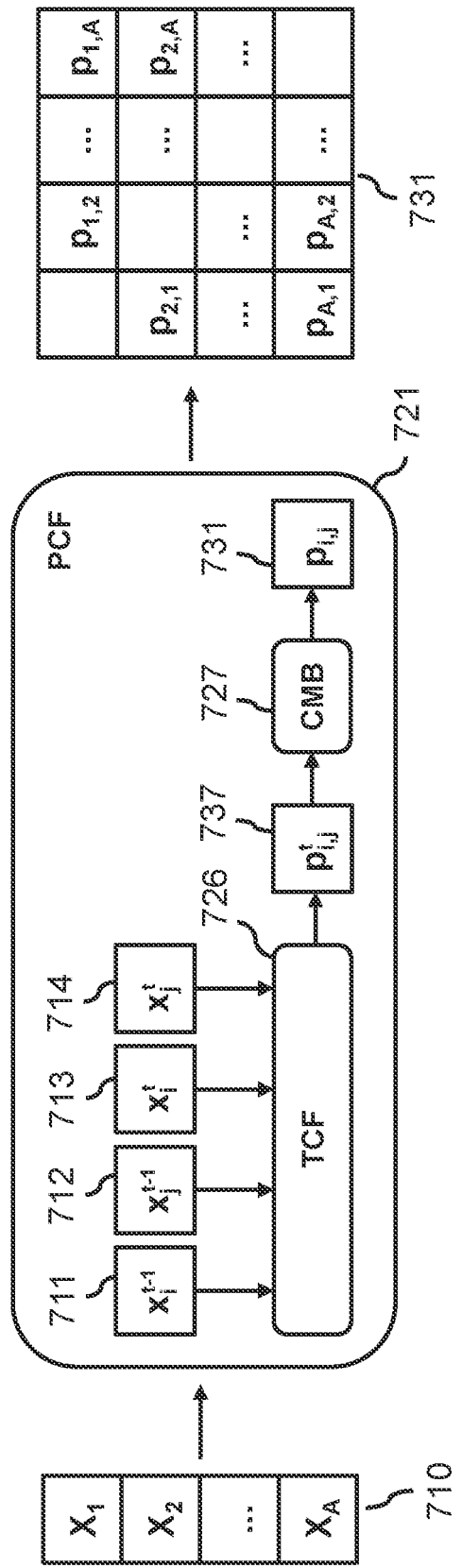

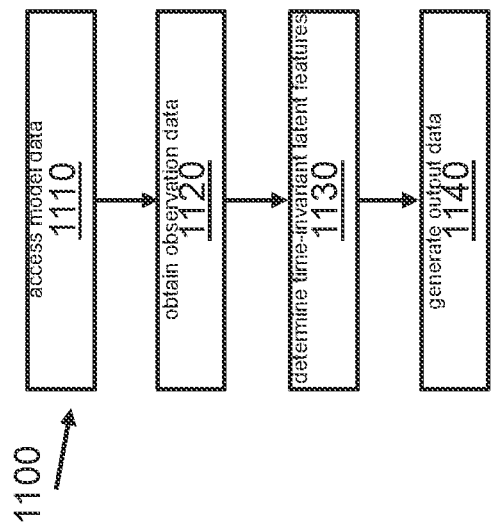
Fig. 11
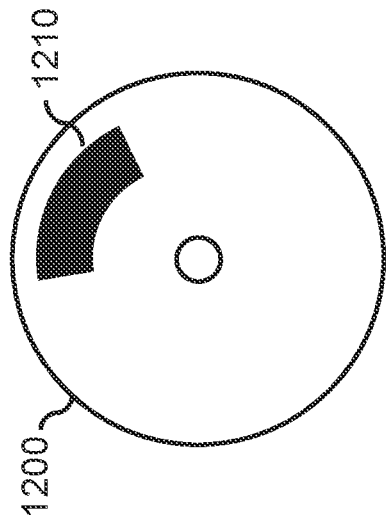
Fig. 12
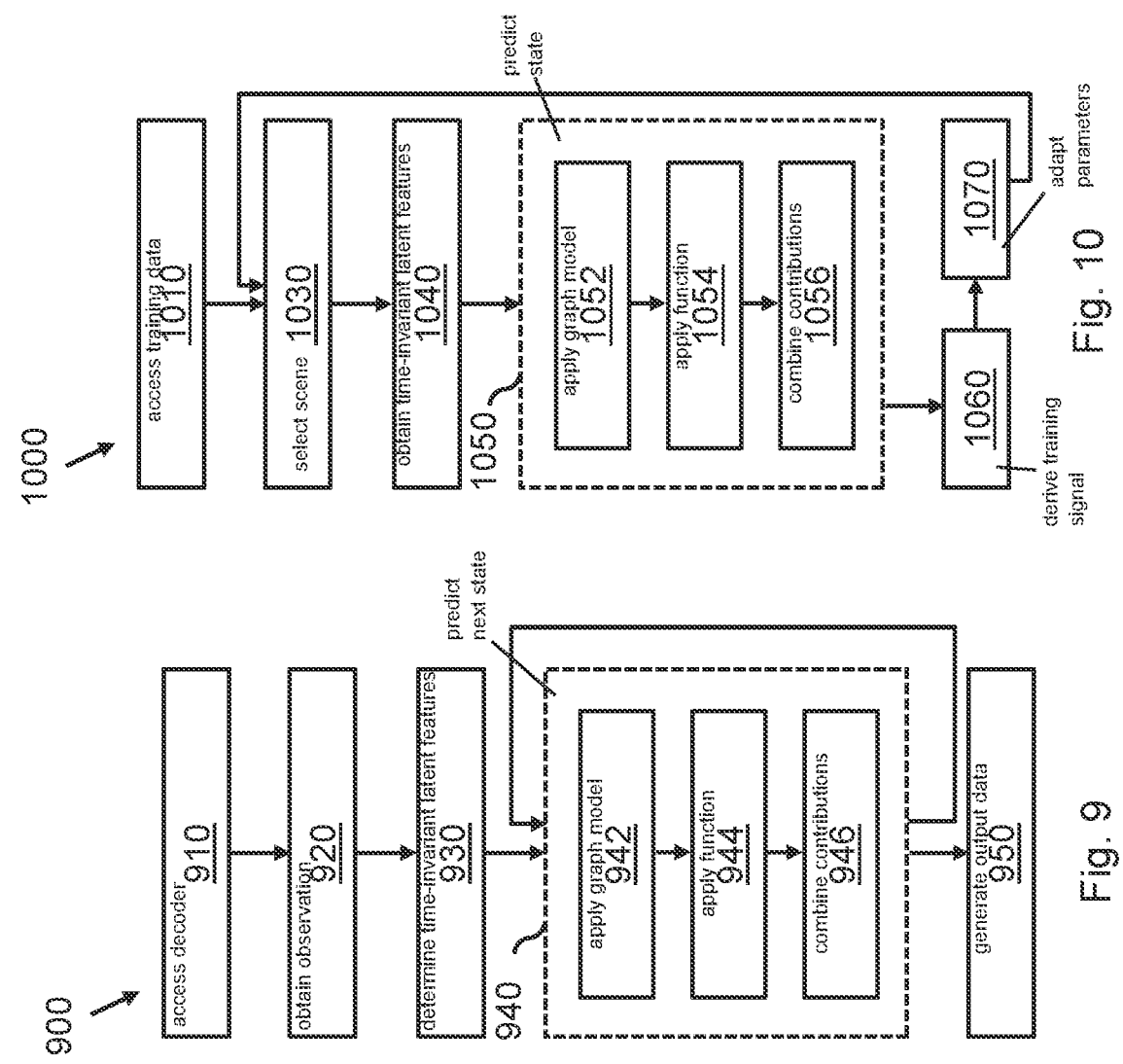
Fig. 10
Fig. 9

MAKING TIME-SERIES PREDICTIONS USING A TRAINED DECODER MODEL

CROSS REFERENCE

The present application claims the benefit under 35 U.S.C. § 119 of European Patent Application No. EP 20181464.7 filed on Jun. 22, 2020, which is expressly incorporated herein by reference in its entirety.

FIELD

The present invention relates to a computer-implemented prediction method of making time-series predictions relating to a computer-controlled system, such as a (semi-) autonomous vehicle, using a decoder model. The present invention further relates to a computer-implemented training method of training such a decoder model, and to a computer-implemented analysis method of analysing observations relating to a computer-controlled system using an encoder model corresponding to the decoder model. The present invention further relates to systems corresponding to the computer-implemented methods, and to a computer-readable medium.

BACKGROUND INFORMATION

In (semi-)autonomous driving systems, an important task is to analyse and predict the environment around the vehicle, for example, in order to automatically break in case a dangerous traffic situation is recognized. This in particular involves predicting trajectories of other traffic participants in the environment of the vehicle, e.g., other vehicles, pedestrians, cyclists, etcetera, based on their observed previous trajectories. However, it turns out in practice that this prediction task is complex to carry out.

Similar prediction tasks, involving multiple objects that interact with each other over time, are also found in various other application areas, such as robotics (in which the objects may be components of the robot, e.g., parts of a robot arm, or objects in an environment in which the robot operates, e.g., other robots or humans); computer networking (in which the objects may be, e.g., different servers that provide interrelated services); power systems management (in which the objects may be, e.g., various components of a power plant); manufacturing (in which the objects may be, e.g., different jointly operating manufacturing tools or components being assembled together); and epidemics (in which the objects may be, e.g., individual disease carriers or regions in which a disease spreads).

As for many other complex tasks involving real-world data, machine learning is a promising technique to tackle such these prediction problems. Using machine learning, a model may be trained to make time-series predictions of the trajectories of the interacting objects based on previous observations. Such a data-driven approach in practice turns out to be much more feasible than manually devising a prediction algorithm, e.g., based on an explicit system of physical equations. Still, obtaining a prediction algorithm that is sufficiently accurate for real-world applications is very challenging.

In T. Kipf et al., "Neural Relational Inference for Interacting Systems" (available at https://arxiv.org/abs/1802.04687 and incorporated herein by reference), an unsupervised model is proposed that learns to infer interactions in an interacting system, while simultaneously learning the dynamics of the system purely from observational data. The model is a variational auto-encoder consisting of two jointly trained parts: an encoder that derives interactions given trajectories, and a decoder that predicts trajectories given the interactions. The interactions are represented by an interaction graph, with nodes representing the interacting objects. The encoder learns a discrete edge type for each edge, representing a type of interaction between the two objects connected by the edge. The decoder uses these edge types to predict trajectories using a graph neural network. The model is trained to simultaneously learn to predict the edge types and to learn the dynamic prediction model in an unsupervised way.

SUMMARY

Existing approaches for predicting trajectories of interacting objects suffer from a number of problems. Generally, the predictions given by existing techniques are, in many practical situations, not sufficiently accurate. As a consequence, for example, dangerous traffic situations may remain undetected, or, on the other hand, normal traffic situations may be unjustifiably be detected as being dangerous. The inventors realized that one of the causes for this, is a failure to sufficiently take into account global or environmental influences on the prediction mechanism, e.g., mechanisms that do not depend on the relations between objects but which hold for objects individually.

A related problem is that existing techniques allow to derive information about relations between interacting objects, but not of the objects themselves. Such information about the objects themselves is useful, for example, for various downstream tasks, e.g., various tasks in an autonomous vehicle that need information on nearby traffic participants.

Another problem is that existing techniques are typically inefficient to train, e.g., in terms of computational complexity and/or amount of data needed. Especially when training a model on actual observations, for example real-world traffic data, such data is typically expensive to obtain. Moreover, given the complexity of the training tasks, typically, relatively large models are needed, making training complexity particularly relevant.

There is therefore a need to provide time-series prediction techniques that provide more accuracy, that allow to derive object-level knowledge, and/or that have an improved training efficiency.

In accordance with a first aspect of the present invention, a computer-implemented method of making time-series predictions of multiple interacting objects using a trained decoder model, and a corresponding system, are provided. In accordance with another aspect of the present invention, a computer-implemented training method of training such a decoder model, and a corresponding system, are provided. In accordance with a further aspect of the present invention, a computer-implemented analysis method of analysing observations of multiple interacting objects using an encoder model corresponding to such a decoder model, and a corresponding system, are provided. In accordance with an aspect of the present invention, a computer-readable medium is provided.

Various features of the present invention relate to making time-series predictions relating to a computer-controlled system, such as a robot, a (semi-)autonomous vehicle, a manufacturing machine, a personal assistant, or an access control system. A prediction may involve multiple objects that interact with each other. The multiple objects may comprise one or more components of the computer-controlled system itself, and/or one or more objects that are in an environment of the computer-controlled system and that may effect that controlling and/or monitoring of the system. For example, a vehicle may be controlled based on information about nearby other traffic participants, and possibly itself. For a robot, the objects can for example be components of the robot itself, e.g., different components of a robot arm connected to each other by joints, and/or objects in the environment of the robot. In power systems management, the objects can be components of a power plant. In manufacturing, the objects can be different jointly operating manufacturing tools or components being assembled together. Accordingly, the objects are typically distinct physical entities (e.g., independent entities or parts of one or more physical entities), although in principle this is not needed. E.g., the objects can be different computer servers, or processes or virtual machines running on a computer server, etc. In epidemics, the objects may be, e.g., individual disease carriers or regions in which a disease spreads.

Accordingly, a decoder model may be used to make time-series predictions in terms of states of the multiple interacting objects. Such a state may comprise values of one or more measurable quantities of the multiple interacting objects, e.g., for each interacting object, the state may provide a value for each of the measurable quantities. Measurable quantities are also known as observable quantities. In most cases, they are physical quantities, e.g., quantities expressible as SI units or combinations of SI units. In a typical example, the measurable quantities may comprise one or more of a position, a velocity, and an acceleration of the object, for instance. Other relevant physical quantities may be a charge of a particle, a magnetic flux, a force being applied by or to an object, a temperature, etcetera. Other technical objects such as processes or virtual machines may be represented by quantities such as a load percentage and/or an amount of resources consumed, etcetera. In epidemics, an infection rate can be measured, for example.

Interestingly, in this setting of analysing and predicting time-series data of interacting objects involving a decoder model, the inventors envisaged to represent characteristics of the various objects using one or more time-invariant latent features. When making predictions, these features may be determined from one or more observed states; a decoder model can then make use of the determined values to predict one or more next states. Here, "time-invariant" means that the value of the latent feature is assumed by the model to be constant at least during the considered time window, e.g., the time window for which observations are available and for which predictions are made.

Accordingly, the state may contain only those characteristics of an object that are directly or indirectly measurable (e.g. one or more of position, orientation, pose, and velocity); the time-invariant latent features may represent other characteristics that, while not easily or unambiguously measurable, may be important for understanding the interactions between objects. The inventors realized that, in many physical systems, there exist such properties of the individual objects, which help to explain their interactions, e.g. body charge governing electrostatic interaction, but which are too expensive or simply impossible to measure. By estimating them from the observed states they may still be used, e.g., for predictions.

As an example, in a traffic scene, a latent feature of a traffic participant may represent a goal of the traffic participant, e.g., a short-term goal such as a desired lane. A latent feature can also represent a navigation or driving style, a membership to a group of traffic participants, etc. Latent features do not necessarily have a predefined meaning, e.g., a latent feature may be learned in an unsupervised way based on its suitability for making accurate predictions.

Interestingly, in order to predict values of the measurable quantities for an object in a next state, the decoder model may include two distinct components: a trained graph model and a trained function, also referred to herein as the "local function". The graph model may take into account interactions between the object and other objects, whereas the local function may not take such interactions into account. Both can make use of the determined time-invariant latent features. Prediction contributions of the graph model and the local function may then be combined to obtain predicted values of the measurable quantities for the object.

As the inventors realized, by using these two distinct components, the decoder model is effectively forced during training to disentangle prediction aspects that relate to interactions, from prediction aspects that relate to general characteristics of the objects and/or the environment in which they interact. As a result, a model may be obtained that can deal well with variability in such characteristics and/or environment conditions occurring in the training data. Accordingly, the model may be better able to learn and take into account global mechanisms that do not depend on the relation between objects, but which hold for each object individually. The decoder model also typically becomes easier to train because of the use of two separate models that have intrinsically different inductive biases reflecting the modelling goals the components.

As a consequence, a decoder model is obtained that, in many cases, can provide more accurate predictions, and that generalizes better to unseen situations. These advantages are particularly relevant in settings such as autonomous driving, which involve a combination of location-dependent characteristics (e.g., size of roads, amount of traffic, levels of adherence to traffic regulations) and interaction-related characteristics that may or may not be location-independent (e.g., the way in which different traffic participants react to each other).

Specifically, applying the graph model to determine a prediction contribution for a given object may involve determining pairwise contributions of the object with multiple further objects, according to a trained function. The function can take as input previous values of the one or more measurable quantities for the object and the further object, and in some cases (but not necessarily) also the values of the time-invariant latent features for the object and the further object. The pairwise contributions may then be aggregated into an overall contribution, for example, by adding them up or using another type of permutation covariant operator. Graph models based on trainable pairwise functions, such as graph neural networks, have as an advantage that the same graph model may be used regardless of how many interacting objects there are, which allows better data sharing between observed scenes that differ in this respect.

The graph model can be a Markovian graph model in the sense that, to predict a next state, measurable quantities of only one previous state are used (but the time-invariant latent features are still typically derived based on multiple previous states). Thus, the trainable function that determines the pairwise contributions, in such cases takes as input values of the one or more measurable quantities only for the previous state. It is also possible to use multiple previous states however, in which case pairwise contributions can be determined according to a recurrent model, for example.

The local function, on the other hand, may determine the second prediction contribution based on previous values of the one or more measurable quantities, and possibly also values of the time-invariant latent features, for just the object by itself. E.g., the local function does not use measurable quantity values or time-invariant latent features of other objects (although it can use its own time-invariant latent features, which are still typically derived based on measurable quantity values of other objects). The local function also does not use time-invariant latent features of other objects. The local function also does not use any pairwise contributions with other objects, for example. Accordingly, this function may be effectively forced to consider aspects that are independent from interactions with particular other objects. The function can have other inputs though.

For example, the inputs to the local function can comprise at most the previous values of the object itself, or at most the previous values and the time-invariant latent features of the object itself. Similarly to the graph model, also the local function can be Markovian, meaning it uses values of the measurable quantities just of one previous state, or non-Markovian, meaning that multiple previous states can be taken into account, e.g., by using a recurrent model as local function.

The first prediction contribution of the graph model and the second prediction contribution of the local function may then be combined to obtain predicted values of the one or more measurable quantities for the object. It is preferred to use a predetermined combination function, e.g., a combination function that chosen based on domain knowledge rather than being trained from data. It is also preferred to use a combination function that acts feature-by-feature, e.g., the first and second prediction contributions may have the same number of elements as the set of measurable quantities, and a prediction for a measurable quantity may be obtained by combining respective elements of the first and second prediction contributions. The use of predetermined and/or per-feature combination functions further helps to force the model to disentangle different aspects of the prediction.

The most suitable way of combining the prediction contributions generally depends on the particular quantities being measured. In many cases, especially with physical quantities, prediction contributions may be combined according to a mathematical operator, e.g., addition, multiplication, etc. In many practical situations, addition turns out to be a good choice. For example, addition is a natural case in situations where interactions are the consequence of a sum of physical forces being applied to an object. The combination function can output the predicted values of the measurable quantities directly, but its output can also represent a predicted difference with the previous values of the measurable quantities. In this case, the predicted values may be obtained by applying the predicted difference to the previous values, e.g., by adding the previous values and the predicted difference.

In order to determine the values of the time-invariant latent features from the observed states, typically, use is made of a trained encoder model. The encoder model may correspond to the decoder model in the sense that it is trained based on or together with the decoder model. Generally, training the decoder model may be referred to as "forward modelling" while training the encoder model may be referred to as "inverse modelling". Accordingly, the encoder and a decoder may be used jointly to predict trajectories of interacting objects. The encoder may estimate hidden features given past trajectories. The decoder may receive as an input these inferred latent variables, together with the objects' past states, and forecasts their future trajectories. In other words, the decoder may be a generative model of interacting systems and may thus effectively provide a forward mapping from latent variables and past observations to future observations, while the encoder may learn an inverse model, which maps from observations to latent variables.

Similarly to the decoder model, also the encoder model may make use of a graph model, such as a graph neural network. In order to determine time-invariant latent features of an object, the graph model may use pairwise contributions of the object with multiple further objects. A pairwise contribution of the object with a further object may be determined from the values of the one or more measurable quantities of the object and the further object comprised in the one or more observed states. In the encoder model, typically, multiple previous states are used, e.g., pairwise contributions may be determined per previous state or a pairwise contribution may be determined over multiple previous states.

Accordingly, the combination of a decoder model and an encoder model may be beneficially used to address the problems of trajectory prediction and latent feature estimation in scenarios with multiple interacting objects. The time-invariant latent features determined by the encoder model may generally be features of objects which govern their behaviour, but may be hard or even impossible to measure directly. Accordingly, these latent features may be used not only to make better predictions, but also for other downstream tasks. For example, a traffic participant may be classified into a particular type according to a time-invariant latent feature; this type can then be used to more accurately predict the future trajectory, but also for example in a system that provides a visualization of the traffic situation to the user, or that classifies traffic situations into particular classes (e.g., busy or not busy, dangerous or not dangerous). For example, a traffic situation may be classified as dangerous based on having a large amount of children. More generally, a further machine learning model may be applied based on the values of the time-invariant latent features. This further machine learning model could use the observation data as well. In various embodiments, the further machine learning model however does not use the observation data, e.g., the values of the measurable quantities for some or all agents, directly, but instead uses the values of the time-invariant latent features as a proxy.

Interestingly, the tasks of learning to predict future states and learning to estimate values for the time-invariant latent features, may be regarded as two interdependent tasks. On the one hand, recovering informative time-invariant latent feature values improves the accuracy of predictions. On the other hand, training an encoder model to determine time-invariant latent features that give good predictions, improves the informativeness of the latent features that are derived.

Accordingly, the use of time-invariant latent features can allow to improve both predictions by a decoder model, and analysis of time-series observations by an encoder model.

Concerning the training of the decoder model, one possibility is to perform conventional end-to-end training of the decoder model together with the encoder model. That is, based on observed scenes, the decoder model may be trained by selecting a scene; applying the encoder model to determine values of the time-invariant latent features for the objects of the scene; applying the decoder model to predict a state that is also comprised in the scene; and comparing the prediction to the actual state. Based on this comparison, a training signal may be derived based on which both the parameters of the encoder model and of the decoder model may be updated.

Performing conventional end-to-end training may seem to be the only possibility, since the tasks of dynamical model learning and hidden feature estimation seem to be interdependent. Training a decoder model would seem to require sufficiently good estimates of the latent variables while inference of the latent variables would seem to require the availability of an accurate forward (i.e. decoder) model.

Interestingly, however, the inventors realized that it is also possible to separate the training of the encoder model and the decoder model. Namely, when training the decoder model, values of the time-invariant latent features of objects of a scene may be jointly learned as trainable parameters, together with trainable parameters of the decoder model. Based on these learned values of the time-invariant latent features, the encoder model may then be learned in a supervised way.

Performing training using such a two-step approach has several advantages. Training both the encoder and the decoder at the same time is a complex learning task that often exhibits slow convergence rates. By instead splitting up the training into two different, easier, learning tasks, computational complexity of the training is improved, e.g., fewer iterations may be needed to reach an accurate model. Also, the risk of arriving at a local optimum is reduced, and accordingly, it is observed in practice that the resulting encoder and decoder models have higher accuracy, e.g., lead to more accurate predictions. Training in a two-step approach also combines particularly well with having time-invariant latent features for objects. Compared for example to pairwise latent features as used in the art, the number of latent features that are needed as trainable parameters are much fewer (e.g., linear in the number of objects, not quadratic), making it much more efficient to train them.

Interestingly, the two-step training approach also allows to perform semi-supervised learning. Namely, for a subset of objects and/or time-invariant latent features and/or scenes, latent feature values may be available as training data. For example, a latent feature may be manually annotated for objects in a number of scenes. In practice this may be too expensive for the whole dataset, but feasible for a subset of data, e.g., at most 5% or at most 10%. These known latent feature values can then be fixed instead of being trainable parameters while training the decider model. Interestingly, performing semi-supervised joint training of the encoder and decoder can improve the performance of the decoder for prediction, but also of the encoder for deriving latent feature values, regardless of whether the encoder is then used in combination with the decoder.

Another interesting aspect of training the decoder model using the time-invariant latent features as trainable parameters, is that it is possible to train the decoder model without explicitly training a separate trainable encoder model. For example, as also discussed elsewhere, it is possible to instead use the decoder model to derive time-invariant latent features from observed states, e.g., by performing an optimization to determine values for the time-invariant latent features based on which the decoder model is best able to predict the given observed states. For example, also when making time-series predictions as described herein, time-invariant latent features may be determined in this way without using a trainable encoder model separate from the decoder model. Still, the use of an encoder model is usually preferred, e.g., for allowing to compute latent features more efficiently.

Optionally, some or all of the time-invariant latent features may be discrete features having respective finite sets of possible values. Accordingly, determining a latent feature for an object may essentially correspond to classifying the object into a class corresponding to a possible value. When using a decoder model to determine a time-invariant latent feature for making predictions, an output of the trained encoder model may then be discretized to the finite set. When training the decoder, the training signal may be configured to penalize a deviation of the time-invariant latent feature (for example, given as a trainable parameter, or as output by the encoder when performing end-to-end training) from the finite set of possible values.

Generally, such a classification-type learning problem of selecting a value from a finite set of possible values, is easier to solve than a regression-type problem, especially in the unsupervised setting. Accordingly, the inventors found that the use of discrete features greatly improves learning performance and result in higher-quality predictions, and is therefore preferred, especially in combination with unsupervised learning where no values for latent features are given as training data. Also compared to using discrete pairwise features as done in the art, the use of discrete object-level features is advantageous. Using object-level features is, in many cases, a much more parsimonious modelling choice. The number of features is lower, e.g., linear instead of quadratic in the number of objects. Another reason is that combinatorial explosion of the latent space can be avoided, since the number of relevant types of pairs of objects is generally expected to scale quadratically in the number of relevant types of objects themselves. Another reason is that model parameters can be shared across interaction types, e.g., instead of using respective models for the different interaction types. Accordingly, data efficiency is improved.

Generally, predicted states and/or determined time-invariant latent features as described herein, may be used in controlling and/or monitoring the computer-controlled system at hand, in an otherwise conventional way. For example, the states and/or features may be provided to a control unit, e.g., of the semi-autonomous vehicle, robot, or other type of computer-controlled system, for implementing suitable actions. There are many examples in which predicted trajectories are needed for such controlling and monitoring tasks, with which the presented techniques may be readily combined. In particular, in order to determine output data for use in controlling and/or monitoring, a further machine learning model may be applied, e.g., a model that classifies traffic situations as dangerous or safe, e.g., to initiate braking in case of a dangerous traffic situation. As another example, a (semi-)autonomous vehicle may use predicted trajectories of other traffic participants to plan a safe navigation path towards a goal, e.g., one minimizing a risk of collision.

Optionally, the output data may be provided, via an output interface, to an output device which is used in the control or monitoring of the computer-controlled system. The output device may be an actuator associated with the system, the system being controlled by providing control data to the actuator which is based on predicted next state(s) or determined latent features of the system. For example, the actuator may be used to control a vehicle, such as an autonomous or semi-autonomous vehicle, a robot, a manufacturing machine, a building, etc.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the provided modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

FIG. 1 shows a system for training a decoder model for making time-series predictions of multiple interacting objects.

FIG. 2 shows a system for making time-series predictions or analysing observations of multiple interacting objects.

FIG. 7a shows a detailed example of determining pairwise contributions for use in an encoder model.

FIG. 7b shows a detailed example of determining pairwise contributions for use in an encoder model.

FIG. 9 shows a computer-implemented method of making time-series predictions of multiple interacting objects.

FIG. 10 shows a computer-implemented method of training a decoder model.

FIG. 11 shows a computer-implemented method of analysing observations of multiple interacting objects.

FIG. 12 shows a computer-readable medium comprising data.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 4:
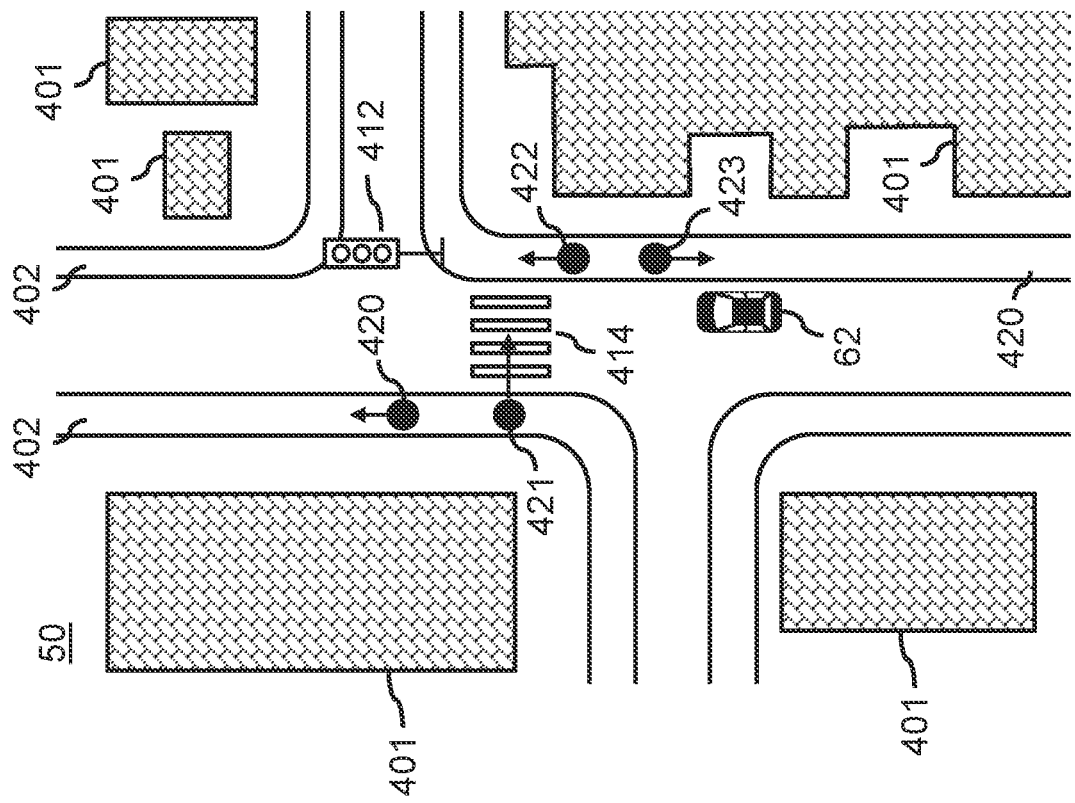
FIG. 4 shows a (semi-)autonomous vehicle operating in an environment.

FIG. 1 shows a training system 100 for training a decoder model 041 for making time-series predictions of multiple interacting objects relating to a computer-controlled system. A respective object may be part of the computer-controlled system or its environment. The system 100 may comprise a data interface 120 for accessing training data 030 representing multiple observed scenes. As shown in the figure, data interface 120 may also be for accessing model data 041 representing the decoder model, an optionally for accessing model data 042 representing an encoder model also trained by system 100. The model data 041, 042 may be for use in analysing observations of interacting objects and/or making time-series predictions of interacting objects according to a method described herein, e.g., by system 200 of FIG. 2. System 100 may be configured to apply the model(s) 041, 042 in addition to training them, e.g., system 100 may be combined with system 200 of FIG. 2.

For example, as also illustrated in FIG. 1, the data interface may be constituted by a data storage interface 120 which may access the data 030, 041, 042 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 021 may be an internal data storage of the system 100, such as a hard drive or SSD, but also an external data storage, e.g., a network-accessible data storage. In some embodiments, the data 030, 041, 042 may each be accessed from a different data storage, e.g., via a different subsystem of the data storage interface 120. Each subsystem may be of a type as is described above for the data storage interface 120.

The system 100 may further comprise a processor subsystem 140 which may be configured to, during operation of the system 100, train the decoder model. The training may be performed in multiple iterations. In an iteration, the processor subsystem 140 may be configured to select an observed scene of the multiple observed scenes. The observed scene may represent a time series of multiple observed states of multiple interacting objects that are part of a computer-controlled system or its environment. A state may comprise values of one or more measurable quantities of the multiple interacting objects. The processor subsystem 140 may further, in the iteration, obtain values of one or more time-invariant latent features for the multiple objects, and may predict a state of the observed scene based on previous states of the observed scene, e.g., using the time-invariant latent features.

To make the prediction, the processor subsystem may apply a graph model of the decoder model 041 to obtain a first prediction contribution for an object. The first prediction contribution may be based on pairwise contributions of the object with multiple further objects. A pairwise contribution of the object with a further object may be determined based on values of the time-invariant latent features and previous values of the one or more measurable quantities for the object and the further object. To make the prediction, processor subsystem 140 may further apply a function of the decoder model to obtain a second prediction contribution for the object. The second prediction contribution may be based on previous values of the one or more measurable quantities, and optionally values of the time-invariant latent features, for the object by itself. To make the prediction, processor subsystem 140 may further combining the first and second prediction contributions to obtain predicted values of the one or more measurable quantities for the object.

As part of the training iteration, processor subsystem 140 may further derive a training signal based on comparing the state of the observed scene to its prediction, and may adapt parameters of the graph model and/or the function based on the training signal.

The system 100 may further comprise an output interface for outputting the model data 041, 042 representing the trained decoder model and encoder model (if using), respectively. For example, as also illustrated in FIG. 1, the output interface may be constituted by the data interface 120, with said interface being in these embodiments an input/output ('IO') interface, via which the trained model data 041, 042 may be stored in the data storage 021. For example, the model data defining the 'untrained' model may during or after the training be replaced, at least in part, by the model data of the trained model, in that the parameters of the dynamics model, such as weights and other types of parameters of neural networks, may be adapted to reflect the training on the training data 030. This is also illustrated in FIG. 1 by showing the untrained and trained model data as the same record. In other embodiments, the trained model data may be stored separately from the model data defining the 'untrained' model. In some embodiments, the output interface may be separate from the data storage interface 120, but may in general be of a type as described above for the data storage interface 120.

FIG. 2 shows a system 200 for generating output data for use in controlling and/or monitoring a computer-controlled system. In particular, the system may be for making time-series predictions of multiple interacting objects that are part of the computer-controlled system or its environment according to a decoder model, and/or for analysing observations of such interacting objects according to an encoder model, based on which this output data may be generated.

The system 200 may comprise a data interface 220 for accessing model data 041 representing a trained decoder model and/or model data 042 representing the trained encoder model. The decoder model and/or encoder model may be as generated by the system 100 of FIG. 1 or as described elsewhere.

For example, as also illustrated in FIG. 2, the data interface may be constituted by a data storage interface 220 which may access the data 041, 042 from a data storage 022. In general, the data interface 220 and the data storage 022 may be of a same type as described with reference to FIG. 1 for the data interface 120 and the data storage 021. Data storage 022 may also comprise observation data representing a time series of one or more observed states of the multiple interacting objects. A state may comprise values of one or more measurable quantities of the multiple interacting objects. As described elsewhere, in some embodiments, the observation data may also be received directly from a sensor 072 via a sensor interface 260 of via another type of interface instead of being accessed from the data storage 022 via the data storage interface 220.

The system 200 may further comprise a processor subsystem 240, which may be configured to, during operation of the system 200, obtain the observation data, e.g., via storage interface 220, or via sensor interface 260.

When using the observation data to make time-series predictions, the processor subsystem 240 may be configured to determine, based on the one or more observed states, values of one or more time-invariant latent features for the multiple objects. The processor subsystem 240 may then predict at least one next state of the multiple interacting objects. To make the prediction, processor subsystem 240 may apply a trained graph model of the decoder model 041 to obtain a first prediction contribution for an object. The first prediction contribution may be based on pairwise contributions of the object with multiple further objects. A pairwise contribution of the object with a further object may be determined based on values of the time-invariant latent features and previous values of the one or more measurable quantities for the object and the further object. To make the prediction, processor subsystem 240 may further apply a trained function of the decoder model 041 to obtain a second prediction contribution for the object, the second prediction contribution being based on previous values of the one or more measurable quantities, and optionally values of the time-invariant latent features, for the object by itself. To make the prediction, processor subsystem 240 may combine the first and second prediction contributions to obtain predicted values of the one or more measurable quantities for the object. Processor subsystem 240 may then generate the output data for controlling and/or monitoring based on the predicted at least one next state.

When using the observation data to analyse the observations, the processor subsystem 240 may use the encoder model 042 to determine, based on the one or more states, values of one or more time-invariant latent features for the multiple objects. This determining may comprise applying a trained graph model of the encoder model 042 based on pairwise contributions of an object with multiple further objects. A pairwise contribution of the object with a further object may be determined from the values of the one or more measurable quantities of the object and the further object comprised in the one or more observed states. Processor subsystem 240 may then generate the output data for controlling and/or monitoring based on the values of the one or more time-invariant latent features, which may optionally comprise applying a further machine leaning model based on the values of said time-invariant latent features.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

FIG. 2 further shows various optional components of the system 200. For example, in some embodiments, the system 200 may comprise a sensor interface 260 for directly accessing sensor data 224 acquired by a sensor 072 in an environment 082. The sensor may be arranged in environment 082 but may also be arranged remotely from the environment 082, for example if the quantity(s) can be measured remotely. The sensor 072 may but does not need to be part of the system 200. The sensor 072 may have any suitable form, such as an image sensor, a video sensor a lidar sensor, a radar sensor, an ultrasonic sensor, a motion sensor, a thermal imaging camera, a pressure sensor, a temperature sensor, etc. The observation data may be derived from the sensor data 072 using conventional means, e.g., image extraction techniques may be used to derive positions of objects from image or video data, etcetera. The sensor data interface 260 may have any suitable form corresponding in type to the type of sensor, including but not limited to a low-level communication interface, e.g., based on 12C or SPI data communication, or a data storage interface of a type as described above for the data interface 220.

In some embodiments, the system 200 may comprise an actuator interface 280 for providing control data 226 to an actuator (not shown) in the environment 082. Such control data 226 may be generated by the processor subsystem 240 to control the actuator based on predicted next states or derived values of time-invariant latent features, as determined using decoder model 041 or encoder model 042. The actuator may be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-)autonomous vehicle.

In other embodiments (not shown in FIG. 2), the system 200 may comprise an output interface to a rendering device, such as a display, a light source, a loudspeaker, a vibration motor, etc., which may be used to generate a sensory perceptible output signal which may be generated based on the predicted states or determined latent feature values. The sensory perceptible output signal may be directly indicative these model outputs, but may also represent a derived sensory perceptible output signal, e.g., for use in guidance, navigation or other type of control of the computer-controlled system.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of the computer-controlled system, e.g., the vehicle, robot or similar, and/or may represent a control system configured to control the computer-controlled system.

Figure 3:
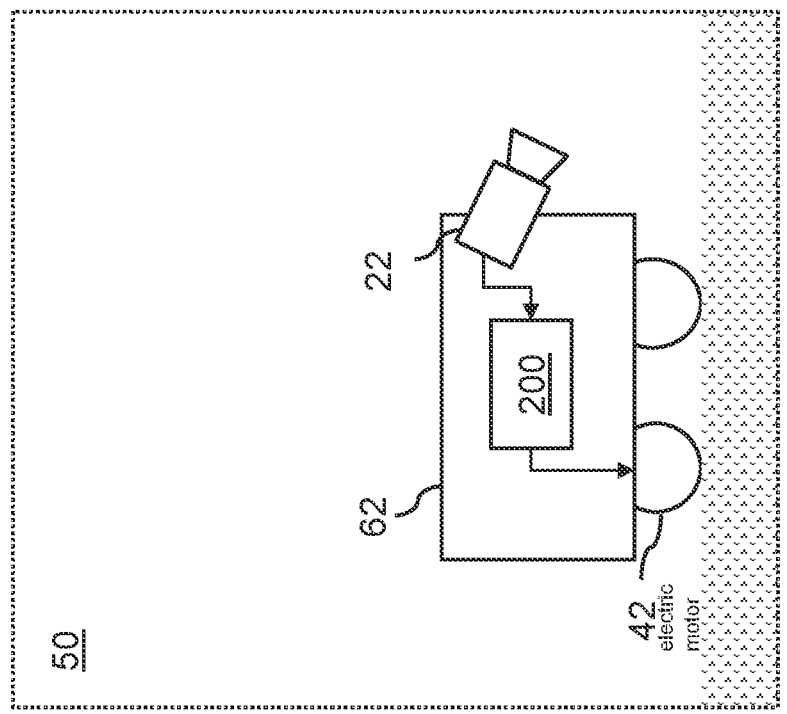
FIG. 3 shows a (semi-)autonomous vehicle, using a system as described herein, operating in an environment.

FIG. 3 shows an example of the above, in that the system 200 is shown to be a control system of an autonomous vehicle 62 (in this case, a car) operating in an environment 50. The autonomous vehicle 62 may be autonomous in that it may comprise an autonomous driving system or a driving assistant system, with the latter also being referred to as a semiautonomous system.

In this example, a state may comprise positional information about multiple traffic participants in environment 50 of the vehicle. For example, the positional information may comprise one or more of a position, a velocity, a pose, and an acceleration of a traffic participant. Usually, the positional information in this example is two-dimensional positional information. Next state(s) predicted by system 200 may be used for monitoring and/or controlling the autonomous vehicle in many different ways.

For example, the autonomous vehicle 62 may incorporate the system 200 to generate, based on next state(s) predicted by system 200, control data for use in controlling the steering and/the braking of the autonomous vehicle. The state(s) may be predicted based on observation data derived from sensor data obtained from a video camera 22 integrated into the vehicle 62.

For example, the control data may be generated to control an electric motor 42 to perform (regenerative) braking in case the autonomous vehicle 62 is expected to collide with a traffic participant. The steering and/or braking may be controlled to avoid collision with the traffic participant. For that purpose, the system 200 may predict one or more next state(s), including positions of one or more traffic participants, based on the sensor data obtained from the video camera. If the future state of the traffic participant is expected to result in a collision, the system 200 may take corresponding action.

FIG. 4 shows a top view of a vehicle 62 operating in environment 50, e.g., vehicle 62 of FIG. 3. For example, shown are a number of buildings 401, and a number of sidewalks 402. Also shown in the figure is a zebra crossing 414 and a traffic light 412.

This figure illustrates a traffic situation with multiple traffic participants in the environment 50 of the vehicle 62. The state of the vehicle 62 and/or traffic participants in its environment, including positional information about the multiple traffic participants, may be predicted according to the techniques described herein. In this example, the traffic participants comprise several pedestrians 420-423. In this non-limiting example, four pedestrians are shown. The pedestrians may operate in the environment 50, e.g., according to a short-term goal, and may also interact with each other and/or with vehicle 62, in the sense that their behaviour may be expected to depend on the presence and behaviour of the other traffic participants.

One may expect, for example, that a crossing likelihood of a pedestrian crossing the road increases when a pedestrian is close to zebra crossing 414. Accordingly, for example, a short-term goal of the pedestrian aiming to cross the road may be derived, e.g., by an encoder model, from the pedestrian being close to pedestrian crossing and/or moving towards the pedestrian crossing. For example, pedestrians 421 and 422 may be more likely to cross the road than pedestrians 420 and 423.

Different derived short-term goals may then lead to a different predicted trajectories. For example, the future trajectory of pedestrian 421 may depend on whether or not it is the short-term goal of the pedestrian to cross the road, but also on the short-term goals of other traffic participants. On the other hand, the short-term goal of the pedestrian may affect the trajectories of other traffic participants. For example, if the short-term goal of vehicle 62 is to drive straight and of pedestrian 621 to cross the road, then vehicle 62 may be predicted to slow down and wait for the pedestrian; and/or pedestrian 621 may be predicted to pause to see whether the car actually waits. If however, the short-term goal of vehicle 62 is to turn left, or the goal of pedestrian 621 is to stay on the sidewalk, then their trajectories may not affect each other.

In this example, a short-term goal of the vehicle 62 comprising the prediction/analysis system 200 is used, but the example also applies in the case where vehicle 62 does not comprise the prediction/analysis system itself, but is instead a vehicle in the environment of that system.

Interestingly, models as described herein may allow to learn from data how such short-time goals, and other information that may be indirectly derivable from direct measurements of quantities such as location and acceleration, influence the future trajectory of the pedestrian. Such information influencing trajectories, as captured by time-invariant latent features for the multiple objects, may moreover be automatically be derived from data. Accordingly, more accurate predictions of future trajectories may be obtained.

Figure 5:
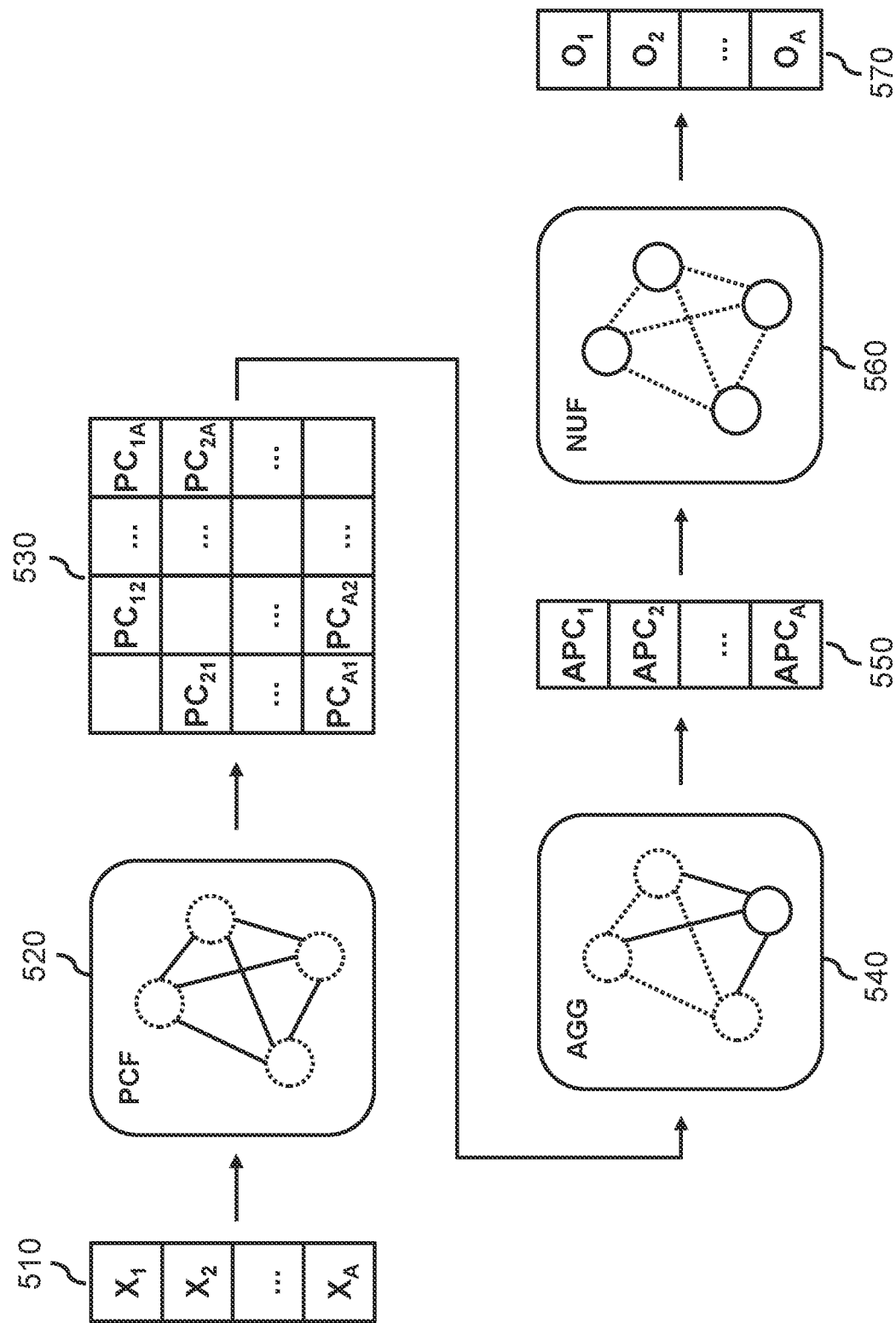
FIG. 5 shows a detailed example of a graph model.

FIG. 5 shows a detailed, yet non-limiting, example of a graph model for use in an encoder and/or decoder model. Generally, a graph model is a model in which data is modelled according to a graph structure. Features for a node of the graph may be determined by determining pairwise contributions of the node with other nodes of the graph, according to a learnable function, and combining these pairwise contributions into an aggregated pairwise contribution for the object. Here, the aggregation typically supports an arbitrary number of other nodes, e.g., aggregating may comprise adding together the pairwise contributions, so that the overall graph model can also typically support an arbitrary number of objects. The graph model is preferably permutation covariant, e.g., the ordering of the objects in the graph may not affect the predictions made for respective objects. For example, the graph model may be configured such that permuting the multiple objects in the input to the graph model leads to a same permutation of the predictions of the predictions for the multiple objects output by the model. This enables the model to better represent sets of objects that do not have an inherent ordering among the objects.

For example, graph models described herein may be graph neural networks, e.g., as disclosed in F. Scarselli et al., "The graph neural network model", IEEE Transactions on Neural Networks, 2009 (incorporated herein by reference). Graph models as described herein may also be an interaction network, as descibed in P. Battaglia et al., "Interaction Networks for Learning about Objects, Relations and Physics" (incorporated herein by reference and available at https://arxiv.org/abs/1612.00222).

The figure illustrates a specific graph model architecture that can be used both for encoder models and for decoder models as described herein. The graph model in the figure is a single-layer graph model on a fully connected graph with interacting objects as nodes. The graph model takes node-level input feature vectors Xi, 510, of respective interacting objects, and computes node-level output feature vectors Oi, 570.

Specifically, shown in the figure are input feature vectors X1, . . . , XA, 510, representing the respective interacting objects whose behaviour is modelled by the graph model. An input feature vector is a vector, typically real-valued, e.g., of one, two, at most or at least five, or at most or at least ten features. Typically, a feature vector of an object comprises values of the measurable quantities and/or the time-invariant latent features of the object, as also described elsewhere.

Also shown in the figure is a pairwise contribution function PCF, 520, also known as an edge update function. The pairwise contribution function may be applied to pairs of input feature vectors Xi, Xj, of different objects. The pairwise contribution function PCF can for example be a neural network or any other suitable machine-learnable function. Applying the pairwise contribution function PCF may result in pairwise contributions PCij, 530, for pairs of input feature vectors Xi, Xj. Mathematically, this may be denoted $$p_{i,j} = \phi([x_i, x_j]) \forall i \neq j \in [A]$$

where [•,•] denotes the vector concatenation and $[A] = \{1, 2, \ldots, A\}$ the set of the first A natural numbers.

The pairwise contributions PCij may then be aggregated per object, e.g., row-wise or column-wise according to the grid structure shown in the figure, according to an aggregation function AGG, 540, resulting in an aggregated pairwise contribution APCi, 550, per object. The aggregation function is typically permutation covariant, e.g., changing the order of the arguments to the function does not affect its outcome. For example, the aggregation function can be an addition, multiplication, average, maximum, or similar. The aggregation function is typically predefined, e.g., it is not parameterized by any trainable parameters. Mathematically, this may be denoted:

$$h_i = \alpha(p_{i,1}, \ldots, p_{i,A}) \forall i \in [A]$$

Finally, an optional node update function NUF, 560, may be applied to respective aggregated pairwise contributions to obtain respective output Oi, 570, of the graph model. The node update function is typically again a machine-learnable function such as a neural network. Mathematically, this may be denoted:

$$o_i = \psi(h_i) \forall i \in [A]$$

Preferably, the functions $\phi$, $\alpha$, $\psi$ making up the graph model are differentiable, making it easier to train the graph model e.g. using gradient descent. For example, a function of the graph model may be multi-layer perceptron, or a recurrent model such as a Gated Recurrent Unit or a Long Short Term Memory Network. In the case of an encoder model with discrete time-invariant latent features, the node update function NUF that determines the output of the encoder model may comprise a function for constraining the output to values sufficiently close to the desired discrete ones, such as a softmax, sigmoid or tanh output layer.

Although a single-layer graph model is illustrated in this figure, generally, the graph models used herein may also comprise multiple layers, for example, two, three, or more. For example, a multi-layer graph model may be implemented by applying the same or different graph models as shown in FIG. 5 multiple times.

Figure 6:
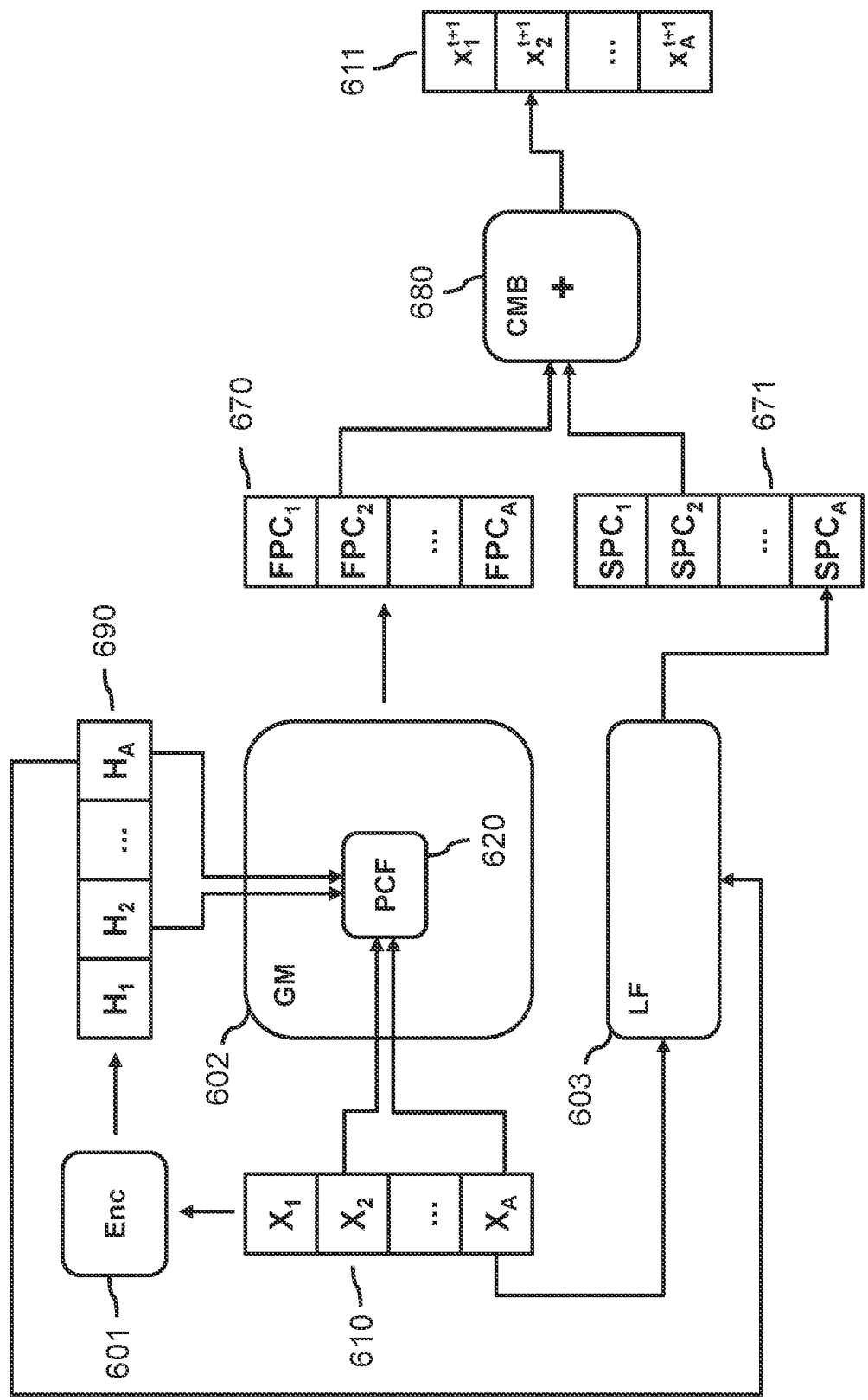
FIG. 6 shows a detailed example of how to predict at least one next state.

FIG. 6 shows a detailed, yet non-limiting, example of how to predict at least one next state of multiple interacting objects. Based on the predicted state(s), output data may be generated for use in controlling and/or monitoring a computer-controlled system, as also described elsewhere.

Shown in the figure is observation data X1, . . . XA, 610, representing a time series of one or more observed states. Typically, there are multiple observed states. The time interval between subsequent observed states is typically constant. The number of observed states used can be at most or at least 10, at most or at least 100, or at most or at least 500, for example. A state may comprise values of one or more measurable quantities of multiple interacting objects of the computer-controlled system and/or its environment. In the figure, the observation data is shown to comprise elements X1, . . . , XA, each representing a time series of values of the one or more measurable quantities for a respective object. Such a per-object time series may be referred to as a trajectory of that object. Accordingly, the scene represented by the observation data may be regarded as comprising trajectories of the multiple objects, a trajectory comprising measurements of the one or more measurable quantities at a common set of time points.

For example, the number of objects A can be at most or at least 5, at most or at least 10, or at most or at least 50. The one or more measurable quantities for the respective object at a certain time point may be represented by a feature vector, e.g., a real-valued feature vector. For example, the feature vector may consist of at least 2, at least 4, at most or at least 6, or at most or at least 10 features.

The measurable quantities may comprise positional information about an object. The measurable quantities may for example comprise a position of the object. For example, the measurable quantities at a point in time may be represented as 2D coordinates or 3D coordinates. Instead or in addition, the measurable quantities may comprise a velocity of the object, expressed as a number or as a vector, e.g., in 2D or 3D. Similarly, instead or in addition, the measurable quantities may comprise an acceleration of the object, expressed as a number or as a vector (e.g., in 2D or 3D). Generally, positional observations may be obtained from various modalities using conventional techniques, e.g., from camera or video data using image extraction, from radar data, etcetera.

However, other measurable quantities may be used in addition to, or instead of, positional information. For example, measurements of temperature, air pressure, etc, may be used. For a robot, a measurable quantity can for example be an amount of pressure being applied by or to a component of the robot. These are examples of physical quantities, although that is not strictly needed. For a computer server or virtual machine, a measurable quantity can be a load, a number of requests per time interval, etc. Generally, the measurable quantities may be measured directly, e.g., using an appropriate sensor, or indirectly, e.g., by deriving a measurement based on measurements of other quantities.

Interestingly, in order to predict next state(s) of the interacting objects, time-invariant latent features may be used. For each of the multiple objects, values of these time-invariant latent features may be determined based on the observed states Xi. Shown in the figure are values H1, ..., HA, 690, of one or more time-invariant latent features for the respective objects, e.g., H1 may represent the values of the time-invariant latent features for a first object, H2 for a second object, etcetera. The number of time-invariant latent features may be 1, at least 2, at most or at least 5, or at most or at least 10, for example. It is possible to use continuous time-invariant latent features, but in preferred embodiments, some or all of the time-invariant latent features are discrete. That is, a time-invariant latent feature has a value from a finite set of possible values. This number of possible values is typically preconfigured. For example, the number of possible values of a time-invariant latent feature may be 2, 3, at most or at least 5, or at most or at least 10. A one-hot encoding may be used to represent a discrete time-invariant latent feature.

Various options are available to compute the values of the time-invariant latent features Hi. The figure shows an encoder model Enc, 601, being used. The encoder model may comprise a trained graph model, e.g., as described with respect to FIG. 5. Accordingly, determining the time-invariant latent features Hi may comprise applying this trained graph model based on pairwise contributions of an object with multiple further objects. A pairwise contribution of the object with a further object may be determined from the values Xi, Xj of the one or more measurable quantities of the object and the further object comprised in the one or more observed states. Various particularly advantageous options for the encoder model Enc are discussed with respect to FIGS. 7a and 7b.

However, it is not needed to use a separate encoder model Enc to determine the time-invariant latent features Hi. As an alternative, the time-invariant latent features Hi may be determined according to the decoder model discussed in this figure, e.g., by performing an optimization to determine values Hi that lead to good predictions for the observations Xi. For example, given candidate values for the time-invariant latent features, and given a subset of states of observation data Xi, predictions may be made of another subset of states of observation data Xi, e.g., as described with respect to this figure. For example, states at time points 1, ..., T−1 may be used to predict respective states at time points 2, ..., T. The candidate values for the latent features that lead to the best predictions for those known states may then be used also to predict next states for which no observations are available. Using a decoder model to determine time-invariant latent features is described further with respect to FIGS. 8a and 8c.

Regardless of whether the time-invariant latent features Hi are determined using an encoder model Enc or otherwise, a discretization may be applied to determine discrete values for the time-invariant latent features. For example, values indicating respective degrees of correspondence or likelihoods for respective discrete values of a time-invariant latent feature may be discretized to a single value, e.g., an integer or a one-hot encoding of the time-invariant latent feature.

Given the observation data Xi and the time-invariant latent features Hi, one or more next states of the multiple interacting objects may be predicted according to a trained decoder model. Mathematically, this may be phrased as follows. Consider a set of A objects, whose state can be probed at discrete points in time 1, ..., T as values of one or more measurable quantities. The state of object i at time t, comprised in observation data Xi, may be denoted as $x_i^t \in \mathbb{R}^F$, where F is the feature dimension, e.g., the number of features used to represent the one or more measurable quantities. The time-invariant latent features Hi of the ith object may be denoted as $h_i$. For example, $h_i$ may comprise at least one discrete feature taking on K possible values. Interestingly, the latent features may not be directly observable.

In various embodiments, the decoder model is a Markovian model, meaning that from the observation data Xi, the decoder model uses only the most recent state. For example, the observed state $x_i^t$ of agent i at time t may be modelled as a function of the last observed states of all agents $\{x_i^{t-1}\}_{i \in [A]}$ and their hidden features $\{h_i\}_{i \in [A]}$. A tensor $x \in \mathbb{R}^{T \times A \times F}$ may be used to denote values of the one or more measurable quantities for all A objects at all T time steps. For the time-invariant latent features, a feature vector $h \in \mathbb{R}^A$ can be used, or, for example, a discrete time-invariant latent feature may be represented as a tensor $h \in [0,1]^{A \times K}$ representing values of the latent feature for respective objects, e.g., as one-hot encodings or a continuous relaxation thereof.

As shown in the figure, the decoder model may comprise a trained graph model GM, 602, and a trained local function LF, 603. The graph model GM may be applied to obtain first prediction contributions FPCi, 670, for respective objects, while the local function LF may be used to obtain second prediction contributions SPCi, 671, for the respective objects. Both modules may take as input the observation data Xi and possibly also the latent features Hi. Interestingly, the graph model GM may be based on pairwise contributions, as discussed further below, effectively allowing information about their state to be shared between objects; while the local function LF may process each object's data (e.g. observations Xi and/or latent features Hi) independently. Accordingly, the graph model GM may be effectively forced to model objects' interactions, while the local function LF may be effectively forced to model behaviours that each object exhibits irrespectively of others, such as interactions with the environment. The first and second contributions FPCi, SPCi, may then be combined, in a combination operation CMB, 680, to obtain predicted values xi,t+1, 611, of the one or more measurable quantities.

The graph model GM used to obtain first prediction contributions FPCi, may use the architecture discussed with respect to FIG. 5. The first prediction contribution FPCi for an object may be based on pairwise contributions of the object with multiple further objects. A pairwise contribution of the object with a further object may be determined based on values Hi, Hj of the time-invariant latent features and previous values Xi, Xj of the one or more measurable quantities for the object and the further object. The previous values can be from the immediately preceding state, thus obtaining a Markovian graph model, or from multiple previous states.

As a concrete example, when using the graph model architecture of FIG. 5, the following choices can be made. The pairwise contribution function can be a multi-layer perceptron, taking as input the most recent previous values and the time-invariant latent features. The pairwise contributions $p_{i,j}^t$ can then be aggregated by summation, after which a node update function may be applied that is given by a further multi-layer perceptron to obtain the first prediction contribution $n_i^t$. Mathematically, this may be denoted as:

$$p_{i,j}^t = MLP_1([x_i^t, h_i, x_j^t, h_j]) \forall i \neq j \in [A],$$

$$n_i^t = MLP_2(\Sigma_{j \neq i} p_{i,j}^t) \forall i \in [A].$$

The trained local function LF may determine a second prediction contribution SPCi for an object based on previous values for the measurable quantities Xi of that object. This can be the values from the most recent previous state, to get a Markovian function, but also values from multiple previous states. The trained local function may also optionally use values of the time-invariant latent features Hi of that object. Previous values and latent features for other objects are not input to the local function LF however. For example, the local function LF may be implemented as a multi-layer perceptron, e.g.:

$$e_i^t = MLP_3(x_i^t) \forall i \in [A].$$

In order to combine the first and second contributions FPCi, SPCi to get predicted values xi,t+1, the combination operation CMB typically applies a predefined combination function, e.g., a combination function that is not parameterized by trainable parameters. The combination function may also use the previous state, e.g., the combination of the contributions may lead to an offset that is applied to the immediately preceding state. The combination function may operate elementwise, e.g., by elementwise addition. First and second contributions and prediction xi,t+1 may each have the same number of elements, corresponding to the number of features used to represent the one or more measurable quantities. For example, prediction $x^{t+1}$ and immediately preceding state $x^t$ may relate to each other according to:

$$\Delta x^t := x^{t+1} - x^t = (n_i^t + e_i^t)_{i \in [A]}.$$

In some embodiments, multiple next states of the interacting objects may be predicted. To this end, the predicted values xi,t+1 of the one or more measurable quantities may be used (optionally in combination with previous predicted or observed values) as input to a further application of the decoder model. Typically, the same values for the latent features are used again, e.g., encoder model Enc is typically not applied again. For example, this way, the state may be predicted at least 2, at most or at least 10, or at most or at least 50 time steps into the future.

FIG. 7a shows a detailed, yet non-limiting, example of determining pairwise contributions for use in an encoder model.

The figure shows a pairwise contribution function PCF, 720, being used to determine pairwise contributions pi,j,T, 730, of respective objects with respective other objects, based on observation data Xi, 710. The observation data may represent a time series of states, a state comprising values of one or more measurable quantities for multiple interacting objects. Observation data is further discussed with respect to FIG. 6. Pairwise contribution function PCF may be used as a pairwise contribution function in an encoder model according to the architecture of FIG. 5.

In this example, pairwise contribution pi,j,T may be determined by applying a trainable recurrent model RM, 725, to the values of the one or more measurable quantities of the object and the further object. Thus, a pairwise contribution may be determined by successively updating a value of the pairwise contribution pi,j,t, 736 from a previous value of the pairwise contribution pi,j,t−1 according to the recurrent model RM. The initial values for the pairwise contribution, e.g., pi,j,0, can be initialized with zeros, for example. The recurrent model RM can then be iteratively applied, e.g., starting with pi,j,0, to obtain pi,j,1, pi,j,2, etc. The pairwise contribution pi,j,t for the most recent state, may then be used as output pi,j,T of the pairwise contribution function. Conventional recurrent models, e.g., recurrent neural networks such as Long Short-Term Memories and Gated Recurrent Units can be used as recurrent model RM.

In respective applications of the recurrent model RM, the model may take as input the values of the one or more measurable quantities from respective states. It is also possible for the recurrent model to use values from multiple states, in a sliding window fashion. For example, shown in the figure is a recurrent model RM taking values of the measurable quantities at a current state xi,t, 713 and xj,t, 714 for the two objects, as well as at the immediately preceding state xi,t−1, 711, and xj,t−1, 712.

Interestingly, by using a recurrent model RM, an encoder model may be obtained that supports both Markovian and non-Markovian systems. As an example, an encoder model according to an embodiment may use the pairwise contribution function PCF shown in this figure, in combination with summation as an aggregation function and a further trainable function, e.g., a multi-layer perceptron, as a node update function, e.g.:

$$p_{i,j}^t = RNN([x_i^t, x_j^t, x_i^{t-1}, x_j^{t-1}], p_{i,j}^{t-1}) i \neq j \in [A],$$

$$h_i = MLP_4(\Sigma_{j \neq i} p_{i,j}^T) \forall i \in [A].$$

Here, concatenation for the RNN is along the feature axis.

FIG. 7b shows a detailed, yet non-limiting, example of determining pairwise contributions for use in an encoder model.

Similarly to FIG. 7a, this figure shows a pairwise contribution function PCF, 721, being used to determine pairwise contributions pi,j, 731, of respective objects with respective other objects, based on observation data Xi, 710. The observation data may represent a time series of states, a state comprising values of one or more measurable quantities for multiple interacting objects.

Observation data is further discussed with respect to FIG. 6. Pairwise contribution function PCF may be used as a pairwise contribution function in an encoder model according to the architecture of FIG. 5.

In this example, a pairwise contribution pi,j, 731, for a pair of two objects may be determined by independently determining per-time-point pairwise contributions pi,i,t, 737, and combining the per-time-point pairwise contributions pi,j,t to obtain the pairwise contribution pi,j that is output by the pairwise contribution function PCF.

Specifically, shown in the figure is a timepoint contribution function TCF, 726. This is typically a trainable function. The timepoint contribution function TCF may take as input values of the measurable quantities at a time point, and optionally a fixed number of immediately preceding time points, of the two objects. The timepoint contribution function TCF in this figure takes as input the current and immediately preceding values of the measurable quantities for the first object xi,t−1, xi,t and for the second object xj,t−1, xj,t. For example, the timepoint contribution function TCF can be a multilayer perceptron:

$$p_{i,j}^t = MLP_5([x_i^t, x_j^t, x_i^{t-1}, x_j^{t-1}]) i \neq j \in [A]$$

To combine the per-time-point pairwise contributions $p_{i,j,t}$ into overall pairwise contribution $p_{i,j}$, a suitable permutation covariant operator may be used. For example, the operator may involve summation of the per-time-point contributions $p_{i,j,t}$, optionally followed by applying a trainable function such as multi-layer perceptron, e.g.:

$$p_{i,j} = MLP_6(\Sigma_{t \in [T]} p_{i,j}^t) i \neq j \in [A]$$

By combining independently determined per-time-point contributions, this pairwise contribution function PCF may be particularly suitable for modelling Markovian systems, in which case it provides a particularly good trade-off between accuracy and computational cost.

For example, an encoder model according to an embodiment may combine this pairwise contribution function PCF with summation as an aggregation function and a further trainable function, e.g., a, multi-layer perceptron, as node update function, e.g.:

$$h_i = MLP_7(\Sigma_{j \neq i} p_{i,j}) \forall i \in [A].$$

Interestingly, the pairwise contribution functions PCF described with respect to this figure allow to enforce robustness of the encoder model with respect to permutation of the observed time steps, while circumventing the problem of vanishing gradients.

Turning now to the training of encoder and/or decoder models as described herein. Generally, in order to train the encoder and/or decoder, training data may be used representing multiple observed scenes. A scene may comprise multiple observed states. The number of objects can differ between scenes, and also the number of states can differ between scenes. For example, the total number of scenes available may be at most or at least 500, at most or at least 10000, or at most or at least 50000. The total number of states over all scenes can be at most or at least 50000, at most or at least 250000, at most or at least 1000000, or at most or at least 5000000, for example.

Generally, a decoder model, e.g., as described with respect to FIG. 5, may be trained based on a set of training scenes by repeatedly selecting a scene, predicting one or more states of the scene based on other states of the scene; deriving a training signal based on comparing the state of the scene to its prediction, and adapting trainable parameters based on the training signal.

For example, the encoder model and decoder model may be trained together end-to-end in a conventional way. For example, an optimization may be performed, e.g., by gradient descent or similar, of the objective function $$\arg\min_{v,w} \|(\Delta x^t - f_v(x^t, g_w(x)))_{t \in [T]}\|_2.$$

Here $f$ is the decoder model, parametrized by v, and g is the encoder, parametrized by w. In this example, the decoder model $f$ is configured to output a predicted difference to an immediately preceding state, which the objective function compares to the actual difference $\Delta x^t := x^{t+1} - x^t$. However, the decoder model can also output the predicted state instead.

Interestingly, however, in various embodiments described below, the training of the encoder model and decoder model are decoupled, in the sense that the decoder model is trained without simultaneously also training the encoder model. The encoder model may then be trained later based on the trained decoder model. It is even possible not to use an encoder model but to instead use the decoder model to determine values of the time-invariant latent features, as also discussed elsewhere.

Figure 8A:
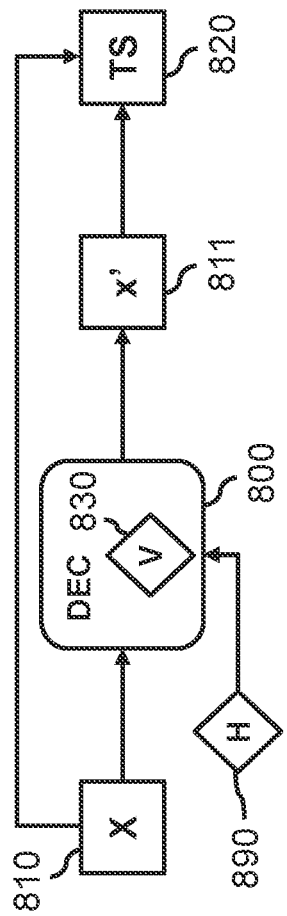
FIG. 8a shows a detailed example of how to train a decoder model.

FIG. 8a shows a detailed, yet non-limiting, example of how to train a decoder model. As illustrated in the figure, this example follows the general structure of selecting a scene X, 810; determining a prediction x', 811 for a state of the scene; deriving a training signal TS, 820 based on comparing the state X to the prediction x'; and adapting parameters V, 830, of the decoder model, e.g., the graph model and/or the local function, based on the training signal TS.

Interestingly, in this example, also the values H, 890, of one or more time-invariant latent features of an object of the scene are trainable parameters that are jointly learned together with the trainable parameters V of the decoder model. For example, in some or all iterations, both decoder parameters V and latent features H may be updated based on the same training signal TS. Or, in some iterations the decoder parameters V may be updated while in other interleaved iterations the latent features H may be updated. The parameters of the encoder model are not simultaneously updated, however; in fact, the encoder model is typically not used at all in this example while training the decoder.

Typically, training is performed using an iterative optimization method in which an objective function is optimized. For example, the objective function can quantify a prediction error, e.g., as a L2 loss. The optimization can be a stochastic optimization such as stochastic gradient descent. For example, the Adam optimizer may be used, as disclosed in Kingma and Ba, "Adam: A Method for Stochastic Optimization" (available at https://arxiv.org/abs/1412.6980 and incorporated herein by reference). As is conventional, such optimization methods may be heuristic and/or arrive at a local optimum. Training may be performed on a scene-by-scene basis or in batches, e.g., of at most or at least 64 or at most or at least 256 scenes.

Interestingly, the training dataset may be partially annotated, meaning that it comprises values of the time-invariant latent features for at least some time-invariant features of at least some objects in at least some scenes. These values are then fixed instead of being trained as trainable parameters. For a given latent feature, the training dataset may comprise any combination of fully annotated scenes, partially annotated scenes, and non-annotated scenes. In a fully annotated scene, for all objects, values of the latent feature are available. In a partially annotated scene, for some but not all objects, values of the latent feature are available. In a non-annotated scene, no values of the latent feature are available. Availability of latent feature values can differ from latent feature to latent feature. However, at least for some latent features, at least some objects in some scenes are not available but trained as trainable parameters. Generally, any combination of available annotations is supported, and can help to ensure that the time-invariant latent feature is trained to derive information of a certain kind. For example, over the whole training data, values of a given time-invariant latent feature may be available for at most 20%, at most 10%, or even at most 1% of all objects in all scenes. Still, accurate semi-supervised learning of that time-invariant latent feature may be achieved.

However, unsupervised learning is also possible, or semi-supervised learning of some latent features can be combined with supervised learning of other latent features for example.

Discrete latent features, if using, may for efficiency reasons be trained as continuous parameters. For example, in the case of a single discrete latent feature using a one-hot encoding, a discrete feature may be represented as $h \in H$ where $H=\{h|h\in\{0,1\}^{A\times K}, \|h_i\|_1=1\ \forall i\in[A]\}$. During training, integrality constraint $h\in H$ may be relaxed to $h\in[0,1]^{A\times K}$. In this case, it is beneficial if the training signal rewards trainable continuous parameters for lying close to the discrete set of possible values. For example, a loss term may be used that punishes deviation from the set of possible values. This is especially beneficial if a latent feature is not labelled or the number of labelled values is relatively small. As the inventors observed, in such cases, the trainable latent features will usually cluster and need to be regularized to get close to the set of possible values.

Specifically, to train the parameters V of the decoder model and the time-invariant latent features H, the following optimization may be performed:

$$\arg\min_{v,h} \|(\Delta x^t - f_v(x^t, h))_{t\in[T]}\|_2.$$

Here, $f_v(x^t, h)$ are values of the measurable quantities as predicted by the decoder model and $\Delta x^t$ are the actual values, or equivalently, $f_v(x^t, h)$ is a difference of the measurable quantities with values from the previous state as predicted by the decoder model, and $\Delta x^t$ is the actual difference. For example, in the particular case where each of the S training scenes has the same number of T time steps, an optimization may be performed to minimize a loss representing the average norm, e.g., $l^2$ norm, of the one-step-ahead prediction error across the time steps and training samples:

$$L = \frac{1}{TS}\sum_{S=1}^{S}\sum_{t=1}^{T}\|\Delta x_s^t - (x_s^t)_{true}\|_2,$$

where $\Delta x_s^t$ is a prediction by the decoder and $(x_s^t)_{true}$ the corresponding observed value.

The inventors found that several measures can be taken, alone or in combination, to significantly improve the robustness of the optimization.

In some embodiments, to improve robustness, the values of the time-invariant latent feature vectors may be kept constant during a number of initial iterations, for example, for at most 5 or at most 10 iterations. For example, when using a one-hot encoding with K possible discrete values, initially constant one-hot encoding $h=(1/K, \ldots, 1/K)$ may be used.

In some embodiments, a regularization term may be included in the optimization punishing deviations of discrete time-invariant latent features from the set of possible values. Apart from allowing better training of discrete features, this term was also found to improve robustness. It was found to be particularly effective to not include the term initially but to add it to the objective function after a number of iterations, e.g., after the latent features are found to have separated, e.g., clustered, to a sufficient degree.

In some embodiments, to improve robustness, after a number of iterations in which the time-invariant latent features are learned as trainable parameters, the latent features may be fixed for the remainder of the optimization, in which the decoder continues to be trained. In particular, a discrete latent feature may be fixed to a discretization of its learned relaxation.

Interestingly, instead of fixing a latent feature based on its value as a learned parameter, the inventors realized that it is also possible to determine the fixed value using the decoder DEC as trained so far. Accordingly, an optimization may be performed to determine values of the time-invariant latent features that lead to the decoder DEC making the most accurate predictions. For example, an optimization $$\arg\min_{h\in H}\|(x^{t+k} - x^t - f_v^k(x^t, h))_{t\in[T]}\|_2$$

may be performed for some $k\in\mathbb{N}$, where $f^k$ is an iterative application of the decoder $f$ DEC, as trained so far, that predicts k steps into the future, and where and $\hat{v}$ denotes current values of the decoder parameters. For example, the number of steps may be chosen to be at most or at least 5, at most or at least 10, or at most or at least 20. For example, the optimization may be performed using a first-order gradient-based algorithm, or, for discrete values, using grid- or beam-search or similar. The latter may be faster depending on the number of objects and number of possible values of the discrete features, and may enable to use decoder models for which the function $f_v(x, \cdot)$ is not well-behaved.

As the inventors realized, given a trained decoder model DEC, the above optimization for determining values of the time-invariant latent features may be regarded as a type of encoder. For example, when applying the decoder, e.g., as discussed with respect to FIG. 2 or FIG. 6, time-invariant latent features may be determined by performing an optimization based on the decoder model, e.g., instead of applying a separate encoder model. Accordingly, it is also possible and useful to train the decoder model DEC without subsequently training an encoder model. A trained encoder model is however generally preferred for reasons of efficiency.

Figure 8C:
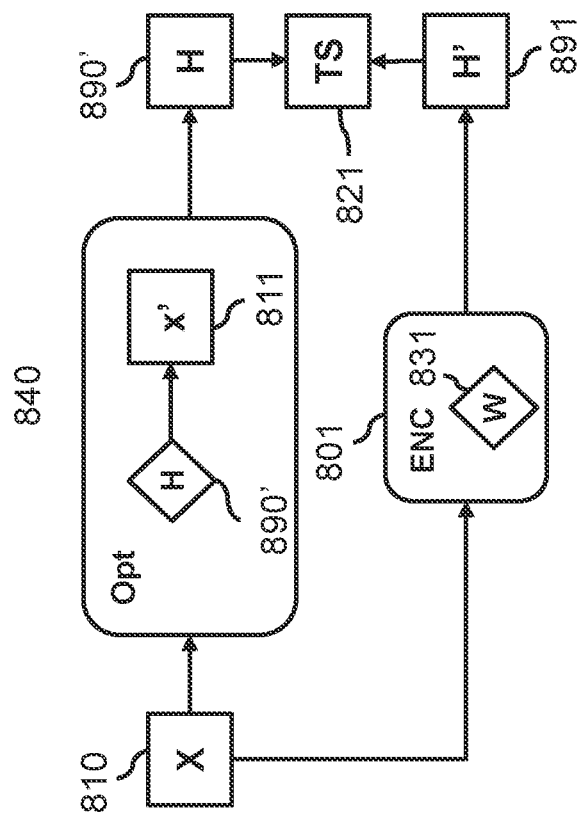
FIG. 8c shows a detailed example of how to train an encoder model.
Figure 8B:
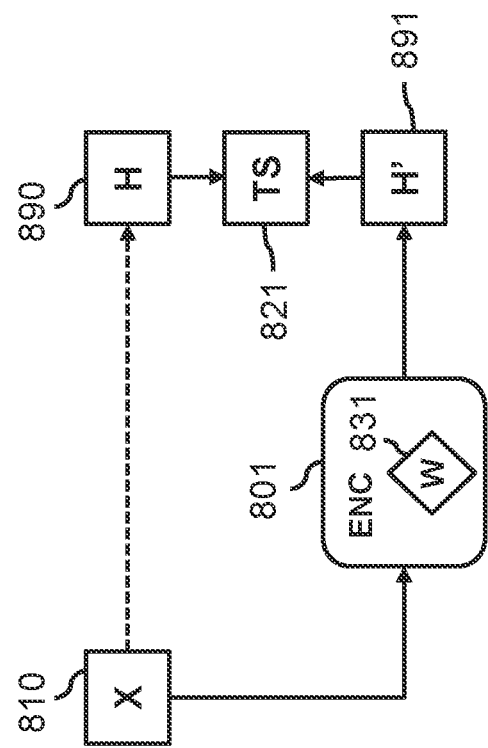
FIG. 8b shows a detailed example of how to train an encoder model.

FIG. 8b shows a detailed, yet non-limiting, example of how to train an encoder model Enc, 801. For example, this technique may be applied after training a decoder model according to FIG. 8a.

In this example, the encoder model is trained in a supervised way based on training scenes X, 810, and corresponding known time-invariant latent feature values H, 890, for the objects of the scenes. The used time-invariant latent features H may correspond to the values learned as trainable parameters when training the decoder model. In the case of discrete latent features H, they are preferably discretized by selecting the closest value in the set of possible discrete values.

Based on a training scene X, the encoder model Enc may be applied to determine values H' for the time-invariant latent features; these values may then be compared to the known values H to derive a training signal TS, 821, based on which the parameters W, 831, of the encoder model, may be adapted. Typically, the training of the encoder model may be performed by optimizing a loss function, e.g., a L2 norm of a difference between determined values H' and known values H or a cross-entropy.

Although the encoder model is in this example trained in a supervised way, it is noted that the overall training of the encoder model and decoder model together is not a fully-supervised learning task, since the overall training does not use a full set of ground truth labels for the latent feature values, but only, and optionally, a subset of it. Encoder Enc can then be used to analyse new scenes by determine time-invariant latent feature values for the new scenes.

FIG. 8c shows a detailed, yet non-limiting example of how to train an encoder model. This example is based on the example of FIG. 8b. Similarly to that figure, parameters W, 831, of an encoder model Enc, 801, may be trained in a supervised way based on applying the encoder model Enc to a scene X, 810, to obtain values H', 891, of the one or more time-invariant latent features, and comparing those values to known values H, 890', to derive a training signal TS, 821. Based on the training signal, parameters W may be adjusted.

This figure illustrates the case where known values H are not determined based on the values for the latent feature vectors learned when training the decoder model. Instead, the known values H are in this example determined in an optimization Opt, 840. Optimization Opt selects values H such that they lead to the best predictions x', 811, by the decoder model. Detailed examples of this are discussed with respect to FIG. 8a.

Generally, the trainable components of encoder models and decoder models as described herein (e.g., the graph models, pairwise contribution functions, node update functions, and local functions), may be implemented using various types of trainable functions. For example, a trainable function may be implemented using a multi-layer perceptron or another type of neural network, e.g., a convolutional neural network, etc. For example, the number of layers of a used neural network may be at least two, at least 5 or at least 10, and the number of nodes and/or weights may be at least 1000 or at least 10000. In the case of neural networks, the trained parameters of the decoder and/or encoder networks may comprise weights of nodes of the neural network. It is also possible to use other types of trainable functions, e.g., Gaussian processes. Generally, the number of trainable parameters of the encoder network and/or the decoder network may be at least 1000, or at least 100000. It is beneficial from the point of view of efficiency of training to use trainable functions that are amenable to gradient-based optimization, e.g., that are continuous and/or differentiable in their set of parameters.

Several concrete examples are now given of encoder and/or decoder models as described herein. In these examples, the encoder and decoder models are applied to training data representing interacting particles according to three physical models. In the first example, behaviour of particles connected by springs is modelled. In the second example, charged particles are modelled whose interactions are defined by Coulomb's law. In the third example, the behaviour of coupled oscillators is modelled according to the Kuramoto model. The design choices described below are found to work well for this particular observation data, but can be used for other types of observation data as well.

In the three examples, the encoder and decoder models are configured with objects having one discrete time-invariant latent feature with K=2 possible values. The measurable quantities are the positions and velocities of the objects, in this example, in 2D. Below, x is used to denote particle positions and v to denote their velocities. Accordingly, the values of the measurable quantities for an object in a state may be represented as four-dimensional vector $(x_1, x_2, v_1, v_2)$.

For the decoder model, the architecture of FIG. 6 is used, with multi-layer perceptrons (MLPs) used for the local function of FIG. 6 and the pairwise contribution function and node update function of FIG. 5. For the encoder model, a graph model according to FIG. 5 is used with an MLP as node update function. The encoder model used for the charged particles and springs is a Markovian encoder according to FIG. 7b. The timepoint contribution function of FIG. 7b is implemented as an MLP as well. The MLPs in this example have 2 hidden layers of 32 neurons each. As activation function of the MLP, a continuously differentiable exponential linear unit is used. For the Kuramoto example, a recurrent encoder according to FIG. 7a is used. The recurrent model is a single-layer long short-term memory LSTM module with a hidden size of 32. Both in the encoder and in the decoder, pairwise contributions (i.e. $p_{i,j}$, $i \neq j \in [A]$) are 32-dimensional vectors.

The encoder and decoder model are trained in a two-step approach, in both steps using the Adam optimizer with learning rate of 0.001.

The training data for the springs and Kuramoto examples represents the situation where objects with equal hidden features interact. In the Coulomb example, particles of equal hidden features repulse and particles of different hidden features attract. The encoder and decoder model were trained with four different datasets. In the first dataset, all scenes had 2 particles. In the second dataset, all scenes had 5 particles. In the third dataset, one half of the scenes had 4 and half of the scenes had 6 particles. The fourth dataset included scenes with 3, 5, 7 and 9 particles, each with a share of one fourth of the dataset. Each of those models was applied to test data with 2, 3, 4, 5, 6, 7, 8, and 9 particles.

Interestingly, in the springs and Coulomb examples, it is found to be possible to train accurate encoder and decoder models, in an unsupervised way, already with training data consisting of 512 scenes. Better results were obtained with training data consisting of 12288 scenes. In the semi-supervised setting, training was found to work with training data consisting of 640 scenes with a ratio, between labelled and unlabelled scenes, of 1 to 9. For the Kuramoto example, the number of scenes was doubled but a smaller number of states per scene was used. The trained models generalize beyond the number of objects used in the training data, e.g., models trained with 4 or 6 particles were found to work well on test data with 3 particles.

Details are now given on the training data used in the three examples. This training data is synthetically generated according to a physical model.

In the springs example, A particles are represented, each one associated with a discrete random label. Particles of the same type mutually exert a force according to Hooke's law, while particles of different type do not interact. In other words, the force $F_{i,j}$ that is applied to particle i by particle j is determined by $F_{i,j} = -D(x_i - x_j) 1\{h_i = h_j\}$. Moreover, the motion of each particle is governed by Newton's laws.

In the charged particles example, A particles are represented, each with a random charge $q_i$ being either −1 or 1. These particles interact according to a smoothed version of Coulomb's law and, therefore, can either attract or repulse each other. In practice, the force $F_{i,j}$ that is applied to particle i by particle j is computed by $$F_{i,j} = \frac{q_i q_j r_{i,j}}{\|r_{i,j}\|^2 \|r_{i,j}\| + \varepsilon}$$

where $r_{i,j} := x_i - x_j$ is the relative position of the particles and $\varepsilon > 0$ is a smoothing constant. As for the springs model, Newton's laws are used for determining the particles' motion. The smoothing constant is set to $\varepsilon = 0.01$ to avoid that the model has to effectively learn the discontinuous function $x|x|^{-3}$, which may be difficult for various practical choices of the trainable functions used in the encoder and decoder model.

In this example, a bounding box is used when generating the training data to prevent the particles from drifting too far away from each other. The interaction of the bounding box with each particle is modelled by a force, equal to zero inside the box and growing linearly with the distance outside of it. For example, the vertical boundary with x-coordinate w exerts a force $-c \cdot \max(0, p-w)$ on any particle with x-coordinate p. Concretely, c=10 can be used.

In the Kuramoto example, A oscillators are represented with a random natural frequency $\omega_i \in [1,10)$ and a random discrete type $h_i$. Starting with random initial phases $\varphi$ (position on the unit circle), the dynamics of such a system are governed by the differential equation $$\frac{d\varphi_i}{dt} = \omega_i + \sum_{j \neq i} 1\{h_i = h_j\}\sin(\varphi_j - \varphi_i) \quad \forall\, i \in [A],$$

which means that only oscillators of the same type are coupled.

All physical models are simulated by Euler integration with a step size of 0.01. Training examples are obtained by subsampling the resulting data every 10 time steps. This means that effectively, trajectories in this example training data have a step size of 0.1. For the springs and Coulomb examples, a further subsampling may be performed in which only one every 10th point in time is taken. In this case, the final number of time steps in a scene may be set to 500. It should be noted that the second subsampling step does not alter the effective step size of the data when, as a training target, one step prediction error is used with a step size equal to the original one. For the Kuramoto model, the data is kept at its original sampling frequency (in this case, 10) and relatively short trajectories of 50 time steps are used. This prevents the phase locking effect known in this physical system. It is noted that generally, the models do not require the number of time steps to be constant across different scenes of the training data.

FIG. 9 shows a block-diagram of computer-implemented method 900 of making time-series predictions of multiple interacting objects for controlling and/or monitoring a computer-controlled system. A respective object may be part of the computer-controlled system or its environment. The method 900 may correspond to an operation of the system 200 of FIG. 2. However, this is not a limitation, in that the method 900 may also be performed using another system, apparatus or device.

The method 900 may comprise, in an operation titled "ACCESS DECODER", accessing 910 model data representing a trained decoder model.

The method 900 may comprise, in an operation titled "OBTAIN OBSERVATION", obtaining 920 observation data representing a time series of one or more observed states of the multiple interacting objects. A state may comprise values of one or more measurable quantities of the multiple interacting objects.

The method 900 may comprise, in an operation titled "DETERMINE TIME-INVARIANT LATENT FEATURES", determining 930, based on the one or more observed states, values of one or more time-invariant latent features for the multiple objects.

The method 900 may comprise, in an operation titled "PREDICT NEXT STATE", predicting 940 at least one next state of the multiple interacting objects. To perform prediction 940, the method 900 may comprise, in an operation titled "APPLY GRAPH MODEL", applying 942 a trained graph model of the decoder model to obtain a first prediction contribution for an object. The first prediction contribution may be based on pairwise contributions of the object with multiple further objects. A pairwise contribution of the object with a further object may be determined based on values of the time-invariant latent features and previous values of the one or more measurable quantities for the object and the further object. To perform prediction 940, the method 900 may further comprise, in an operation titled "APPLY FUNCTION", applying 944 a trained function of the decoder model to obtain a second prediction contribution for the object. The second prediction contribution may be based on previous values of the one or more measurable quantities, and optionally values of the time-invariant latent features, for the object by itself. To perform prediction 940, the method 900 may further comprise, in an operation titled "COMBINE CONTRIBUTIONS", combining 946 the first and second prediction contributions to obtain predicted values of the one or more measurable quantities for the object.

The method 900 may comprise, in an operation titled "GENERATE OUTPUT DATA", generating 950, based on the predicted at least one next state, output data for use in controlling and/or monitoring the computer-controlled system.

FIG. 1000 shows a block-diagram of computer-implemented method 1000 of training a decoder model for making time-series predictions of multiple interacting objects relating to a computer-controlled system, in the sense that a respective object may be part of the computer-controlled system or its environment. The method 1000 may correspond to an operation of the system 100 of FIG. 1. However, this is not a limitation, in that the method 1000 may also be performed using another system, apparatus or device.

The method 1000 may comprise, in an operation titled "ACCESS TRAINING DATA", accessing 1010 training data representing multiple observed scenes.

The method 1000 may comprise training the decoder model by performing one or more operations 1030-1060 in multiple operations.

In order to train the decoder model, method 1000 may comprise, in an operation titled "SELECT SCENE", selecting 1030 an observed scene of the multiple observed scenes. The scene may represent a time series of multiple observed states of multiple interacting objects. A state may comprise values of one or more measurable quantities of the multiple interacting objects. In order to train the decoder model, method 1000 may comprise, in an operation titled "OBTAIN TIME-INVARIANT LATENT FEATURES", obtaining 1040 values of one or more time-invariant latent features for the multiple objects.

In order to train the decoder model, method 1000 may comprise, in an operation titled "PREDICT STATE", predicting 1050 a state of the observed scene based on previous states of the observed scene. To predict the state, method 1000 may comprise, in an operation titled "APPLY GRAPH MODEL", applying 1052 a graph model of the decoder model to obtain a first prediction contribution for an object. The first prediction contribution may be based on pairwise contributions of the object with multiple further objects. A pairwise contribution of the object with a further object may be determined based on values of the time-invariant latent features and previous values of the one or more measurable quantities for the object and the further object. To predict the state, method 1000 may comprise, in an operation titled "APPLY FUNCTION", applying 1054 a function of the decoder model to obtain a second prediction contribution for the object. The second prediction contribution may be based on previous values of the one or more measurable quantities, and optionally values of the time-invariant latent features, for the object by itself. To predict the state, method 100 may comprise, in an operation titled "COMBINE CONTRIBUTIONS", combining 1056 the first and second prediction contributions to obtain predicted values of the one or more measurable quantities for the object.

In order to train the decoder model, method 1000 may comprise, in an operation titled "DERIVE TRAINING SIGNAL", deriving 1060 a training signal based on comparing the state of the observed scene to its prediction. In order to train the decoder model, method 1000 may comprise, in an operation titled "ADAPT PARAMETERS", adapting 1070 parameters of the graph model and/or the function based on the training signal.

Method 1000 may optionally further comprise training an encoder model as described herein.

FIG. 11 shows a block-diagram of computer-implemented method 1100 of analysing observations of multiple interacting objects for controlling and/or monitoring a computer-controlled system. A respective object may be part of the computer-controlled system or its environment. The method 1100 may correspond to an operation of the system 200 of FIG. 2. However, this is not a limitation, in that the method 1100 may also be performed using another system, apparatus or device.

The method 1100 may comprise, in an operation titled "ACCESS MODEL DATA", accessing 1110 model data representing a trained encoder model. The encoder model may be trained in combination with a decoder model as described herein.

The method 1100 may comprise, in an operation titled "OBTAIN OBSERVATION DATA", obtaining 1120 observation data representing a time series of one or more observed states of the multiple interacting objects. A state may comprise values of one or more measurable quantities of the multiple interacting objects.

The method 1100 may comprise, in an operation titled "DETERMINE TIME-INVARIANT LATENT FEATURES", using 1130 the encoder model to determine, based on the one or more states, values of one or more time-invariant latent features for the multiple objects. This determining may comprise applying a trained graph model of the encoder model based on pairwise contributions of an object with multiple further objects. A pairwise contribution of the object with a further object may be determined from the values of the one or more measurable quantities of the object and the further object comprised in the one or more observed states.

The method 1100 may comprise, in an operation titled "GENERATE OUTPUT DATA", generating 1140, based on the values of the one or more time-invariant latent features, output data for use in controlling and/or monitoring the computer-controlled system.

It will be appreciated that, in general, the operations of method 900 of FIG. 9, method 1000 of FIG. 10, and method 1100 of FIG. 11 may be performed in any suitable order, e.g., consecutively, simultaneously, or a combination thereof, subject to, where applicable, a particular order being necessitated, e.g., by input/output relations. Some or all of the methods may also be combined, e.g., method 900 and/or method 1100 may be performed using an encoder or decoder model previously trained according to method 1000.

The method(s) may be implemented on a computer as a computer implemented method, as dedicated hardware, or as a combination of both. As also illustrated in FIG. 12, instructions for the computer, e.g., executable code, may be stored on a computer readable medium 1200, e.g., in the form of a series 1210 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 12 shows an optical disc 1200. Alternatively, the computer readable medium 1200 may comprise transitory or non-transitory data 1210 being model data representing a decoder model trained according to a method described herein and/or an encoder model trained according to a method described herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device described as including several means, several of these means may be embodied by one and the same item of hardware. The mere fact that certain measures are described separately does not indicate that a combination of these measures cannot be used to advantage.

What is claimed is:

1. A computer-implemented prediction method of making time-series predictions of multiple interacting objects for controlling and/or monitoring a computer-controlled system, wherein each respective object of the multiple interacting objects is part of the computer-controlled system or part of an environment of the computer-controlled system, wherein the computer-controlled system is an autonomous or semi-autonomous vehicle, the method comprising the following steps:

accessing model data representing a trained decoder model;

while the vehicle is operating in the environment:
  obtaining observation data using a camera integrated in the vehicle, the observation data representing a time series of one or more observed states of the multiple interacting objects, each state of the observed states including values of one or more measurable quantities of each respective object of the multiple interacting objects, wherein the multiple interacting objects include multiple traffic participants in the environment of the vehicle;
  determining, based on the one or more observed states, values of one or more time-invariant latent features for each respective object of the multiple interacting objects on a per-object basis;
  predicting a next state of the multiple interacting objects by:
    applying a trained graph model of the decoder model to obtain a first prediction contribution for an object of the multiple interacting objects, the first prediction contribution being based on pairwise contributions of the object with multiple further objects of the multiple interacting objects, each pairwise contribution of the object with each further object of the multiple further objects being determined based on the values of the time-invariant latent features for the object and the further object and previous values of the one or more measurable quantities of the object and the further object;

applying a trained function of the decoder model to obtain a second prediction contribution for the object, the second prediction contribution being based on: previous values of the one or more measurable quantities of only the object and not of any of the other objects of the multiple interacting objects, and based on: the values of the one or more time-invariant latent features of at most the object and not of any of the other objects of the multiple interacting objects, wherein the trained function does not take any interactions with any of the other objects into account in the obtaining of the second prediction contribution;

combining the first and second prediction contributions to obtain predicted values of the one or more measurable quantities for the object;

generating, based on the predicted next state, output data for use in controlling and/or monitoring the vehicle; and controlling the vehicle using the output data, the controlling including controlling steering of the vehicle and/or braking of the vehicle;

wherein each time-invariant latent feature is latent feature which is assumed by the decoder model to be invariant over a time window for which each prediction for the next state is made.

2. The prediction method of claim 1, wherein the values of the one or more time-invariant latent features for an object are determined according to a trained encoder model, the determining including applying a trained graph model of the encoder model based on pairwise contributions of the object with multiple further objects, a pairwise contribution of the object with a further object of the multiple further objects being determined from the values of the one or more measurable quantities of the object and the further object included in the one or more observed states.

3. The prediction method of claim 2, wherein each time-invariant latent feature is a discrete feature having a finite set of possible values, the determining of the time-invariant latent feature including discretizing an output of the trained encoder model to the finite set.

4. The prediction method of claim 1, wherein the one or more measurable quantities include one or more of a position of the object, a velocity of the object, and an acceleration of the object.

5. The method of claim 1, wherein generating the output data includes applying a further machine leaning model based on the values of the time-invariant latent features.

6. The method of claim 1, where inputs to the trained function include only the previous values of the one or more measurable quantities of the object.

7. The method of claim 1, wherein inputs to the trained function include: (i) only the previous values of the one or more measurable quantities of the object, and (ii) the values of the one or more time-invariant latent features of the object.

8. A computer-implemented training method of training a decoder model for making time-series predictions of multiple interacting objects relating to a computer-controlled system, the computer-controlled system being an autonomous or semi-autonomous vehicle, wherein each respective object of the multiple interacting objects is part of the computer-controlled system or part of an environment of the computer-controlled system, the method comprising:

accessing training data representing multiple observed scenes;

training the decoder model by, in multiple iterations:
selecting an observed scene of the multiple observed scenes, the observed scene representing a time series of multiple observed states of multiple interacting objects, each state of the observed states including values of one or more measurable quantities of each respective object of the multiple interacting objects;
obtaining values of one or more time-invariant latent features for each respective object of the multiple interacting objects on a per-object basis;
predicting a state of the observed scene based on previous states of the observed scene by:
applying a graph model of the decoder model to obtain a first prediction contribution for an object, the first prediction contribution being based on pairwise contributions of the object with multiple further objects of the multiple interacting objects, a pairwise contribution of the object with each further object of the multiple further objects being determined based on values of the time-invariant latent features of the object and the further object and previous values of the one or more measurable quantities for the object and the further object;
applying a function of the decoder model to obtain a second prediction contribution for the object, the second prediction contribution being based on: previous values of the one or more measurable quantities of only the object and not of any of the other objects of the multiple interacting objects, and based on: the values of the one or more time-invariant latent features of at most the object and not of any of the other objects of the multiple interacting objects, wherein the function does not take any interactions with any of the other objects into account in the obtaining of the second prediction contribution; and
combining the first and second prediction contributions to obtain predicted values of the one or more measurable quantities for the object; and
deriving a training signal based on comparing the state of the observed scene to the predicted state; and
adapting parameters of the graph model and/or the function based on the training signal;
wherein each time-invariant latent feature is a latent feature which is assumed by the decoder model to be invariant over a time window for which each prediction for the state is made;
wherein the training includes training the decoder model to output data, predicted by the decoder using observation data from a camera integrated in the vehicle, of a next state of an observed scene, for use in computer-controlling the autonomous or semi-autonomous vehicle.

9. The method of claim 8, further comprising:
training an encoder model for determining, from one or more observed states of the multiple interacting objects, the values of the one or more time-invariant latent features for each respective object of the multiple interacting objects on a per-object basis, the determining of the values including applying a trained graph model of the encoder model based on pairwise contributions of the object with multiple further objects, a pairwise contribution of the object with each further object being determined from the values of the one or more measurable quantities of the object and the further object included in the one or more observed states.

10. The method of claim 9, wherein the training of the decoder model includes jointly learning, as trainable parameters, values of one or more time-invariant latent features for each object of the observed scene on a per-object basis, and the method further comprises using the learned values of the one or more time-invariant latent features to perform supervised training of the encoder model.

11. The method of claim 10, wherein the training data includes values of one or more time-invariant latent features for a subset of the objects and/or the time-invariant latent features and/or the observed scenes.

12. A prediction system for making time-series predictions of multiple interacting objects for controlling and/or monitoring a computer-controlled system, wherein each respective object of the multiple interacting objects is part of the computer-controlled system or part of an environment of the computer-controlled system, wherein the computer controlled system is an autonomous or semi-autonomous vehicle, the system comprising:
 a data interface configured to access model data representing a trained decoder model;
 a processor subsystem configured to:
  while the vehicle is operating the environment:
   obtain observation data using a camera integrated in the vehicle, the observation data representing a time series of one or more observed states of the multiple interacting objects, each state of the observed states including values of one or more measurable quantities of each respective object of the multiple interacting objects, wherein the multiple interacting objects include multiple traffic participants in the environment of the vehicle;
   determine, based on the one or more observed states, values of one or more time-invariant latent features for each respective object of the multiple interacting objects on a per-object basis;
   predict a next state of the multiple interacting objects by:
    applying a trained graph model of the decoder model to obtain a first prediction contribution for an object of the multiple interacting objects, the first prediction contribution being based on pairwise contributions of the object with multiple further objects of the multiple interacting objects, each pairwise contribution of the object with each further object of the multiple further objects being determined based on values of the time-invariant latent features of the object and the further object and previous values of the one or more measurable quantities of the object and the further object;
    applying a trained function of the decoder model to obtain a second prediction contribution for the object, the second prediction contribution being based on: previous values of the one or more measurable quantities of only the object and not of any of the other objects of the multiple interacting objects, and based on: the values of the one or more time-invariant latent features of at most the object and not of any of the other objects of the multiple interacting objects, wherein the trained function does not take any interactions with any of the other objects into account in the obtaining of the second prediction contribution; and
    combining the first and second prediction contributions to obtain predicted values of the one or more measurable quantities for the object;
   generate, based on the predicted at least one next state, output data for use in controlling and/or monitoring the vehicle;
  control the vehicle using the output data, the controlling including controlling steering of the vehicle and/or braking of the vehicle;
 wherein each time-invariant latent feature is a latent feature which is assumed by the decoder model to be invariant over a time window for which each prediction for the next state is made.

13. A training system for training a decoder model for making time-series predictions of multiple interacting objects relating to a computer-controlled system, the computer-controlled system being an autonomous or semi-autonomous vehicle, wherein each respective object of the multiple interacting objects is part of the or part of an environment of the computer-controlled system, the system comprising:
 a data interface configured to access training data representing multiple observed scenes;
 a processor subsystem configured to train the decoder model by, in multiple iterations:
  selecting an observed scene of the multiple observed scenes, the observed scene representing a time series of multiple observed states of multiple interacting objects, each state including values of one or more measurable quantities of each respective object of the multiple interacting objects;
  obtaining values of one or more time-invariant latent features for each respective object of the multiple interacting objects on a per-object basis;
  predicting a state of the observed scene based on previous states of the observed scene by:
   applying a graph model of the decoder model to obtain a first prediction contribution for an object, the first prediction contribution being based on pairwise contributions of the object with multiple further objects of the multiple interacting objects, a pairwise contribution of the object with each further object of the multiple further objects being determined based on values of the time-invariant latent features for the object and the further object, and previous values of the one or more measurable quantities for the object and the further object;
   applying a function of the decoder model to obtain a second prediction contribution for the object, the second prediction contribution being based on: previous values of the one or more measurable quantities of only the object and not of any of the other objects of the multiple interacting objects, and based on: the values of the one or more time-invariant latent features of at most the object and not of any of the other objects of the multiple interacting objects, wherein the function does not take any interactions with any of the other objects into account in the obtaining of the second prediction contribution; and
   combining the first and second prediction contributions to obtain predicted values of the one or more measurable quantities for the object;

deriving a training signal based on comparing the state of the observed scene to the predicted state; and adapting parameters of the graph model and/or the function based on the training signal;

wherein each time-invariant latent feature is a latent feature which is assumed by the decoder model to be invariant over a time window for which each prediction for the state is made;

wherein the training includes training the decoder model to output data, predicted by the decoder using observation data from a camera integrated in the vehicle, of a next state of an observed scene, for use in computer-controlling the autonomous or semi-autonomous vehicle.

14. A non-transitory computer-readable medium on which are stored instructions for making time-series predictions of multiple interacting objects for controlling and/or monitoring a computer-controlled system, wherein each respective object of the multiple interacting objects is part of the computer-controlled system or part of an environment of the computer-controlled system, wherein the computer-controlled system is an autonomous or semi-autonomous vehicle, the instructions, when executed by a processor system, causing the processor system to perform the following steps:

accessing model data representing a trained decoder model;

while the vehicle is operating in the environment:

obtaining observation data using a camera integrated in the vehicle, the observation data representing a time series of one or more observed states of the multiple interacting objects, each state of the observed states including values of one or more measurable quantities of each respective object of the multiple interacting objects, wherein the multiple interacting objects include multiple traffic participants in the environment of the vehicle;

determining, based on the one or more observed states, values of one or more time-invariant latent features for each respective object of the multiple interacting objects on a per-object basis;

predicting at least one next state of the multiple interacting objects by:

applying a trained graph model of the decoder model to obtain a first prediction contribution for an object of the multiple interacting objects, the first prediction contribution being based on pairwise contributions of the object with multiple further objects of the multiple interacting objects, each pairwise contribution of the object with each further object of the multiple further objects being determined based on the values of the time-invariant latent features for the object and the further object and previous values of the one or more measurable quantities of the object and the further object;

applying a trained function of the decoder model to obtain a second prediction contribution for the object, the second prediction contribution being based on: previous values of the one or more measurable quantities of only the object and not of any of the other objects of the multiple interacting objects, and based on: the values of the one or more time-invariant latent features of at most the object and not of any of the other objects of the multiple interacting objects, wherein the trained function does not take any interactions with any of the other objects into account in the obtaining of the second prediction contribution;

combining the first and second prediction contributions to obtain predicted values of the one or more measurable quantities for the object;

generating, based on the predicted at least one next state, output data for use in controlling and/or monitoring the vehicle; and controlling the vehicle using the output data, the controlling including controlling steering of the vehicle and/or braking of the vehicle;

wherein each time-invariant latent feature is a latent feature which is assumed by the decoder model to be invariant over a time window for which each prediction for the at least one next state is made.

* * * * *